(12) United States Patent
Kahn et al.

(10) Patent No.: US 9,068,844 B2
(45) Date of Patent: Jun. 30, 2015

(54) METHOD AND APPARATUS FOR AN INTEGRATED PERSONAL NAVIGATION SYSTEM

(75) Inventors: Philippe Richard Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 786 days.

(21) Appl. No.: 12/684,881

(22) Filed: Jan. 8, 2010

(65) Prior Publication Data

US 2011/0172909 A1    Jul. 14, 2011

(51) Int. Cl.
*G01C 21/20* (2006.01)
*G01C 21/16* (2006.01)
*G01C 21/34* (2006.01)

(52) U.S. Cl.
CPC .............. *G01C 21/20* (2013.01); *G01C 21/165* (2013.01); *G01C 21/3423* (2013.01)

(58) Field of Classification Search
CPC .............. G01C 21/36; G01C 21/3602; G01C 21/3626; G01C 21/367; G01C 21/20; G08G 1/096827; G01S 19/42
USPC ......... 701/400, 423–426, 431–435, 437–439, 701/467, 469, 483; 73/178 R
See application file for complete search history.

(56) References Cited

U.S. PATENT DOCUMENTS

| | | |
|---|---|---|
| 4,285,041 A | 8/1981 | Smith |
| 4,571,680 A | 2/1986 | Wu |
| 4,578,769 A | 3/1986 | Frederick |
| 5,446,725 A | 8/1995 | Ishiwatari |
| 5,446,775 A | 8/1995 | Wright et al. |
| 5,583,776 A | 12/1996 | Levi et al. |
| 5,593,431 A | 1/1997 | Sheldon |
| 5,654,619 A | 8/1997 | Iwashita |
| 5,778,882 A | 7/1998 | Raymond et al. |
| 5,955,667 A | 9/1999 | Fyfe |
| 5,976,083 A | 11/1999 | Richardson et al. |
| 6,013,007 A | 1/2000 | Root et al. |
| 6,122,595 A | 9/2000 | Varley et al. |
| 6,135,951 A | 10/2000 | Richardson et al. |
| 6,145,389 A | 11/2000 | Ebeling et al. |
| 6,246,321 B1 | 6/2001 | Rechsteiner et al. |
| 6,282,496 B1 | 8/2001 | Chowdhary |
| 6,369,794 B1 | 4/2002 | Sakurai et al. |

(Continued)

FOREIGN PATENT DOCUMENTS

WO    WO 01/88477    11/2011

OTHER PUBLICATIONS

Anderson, Ian, et al, "Shakra: Tracking and Sharing Daily Activity Levels with Unaugmented Mobile Phones," Mobile Netw Appl, Aug. 3, 2007, pp. 185-199.

(Continued)

*Primary Examiner* — Mary Cheung
(74) *Attorney, Agent, or Firm* — HIPLegal LLP; Judith A. Szepesi

(57) ABSTRACT

A method and apparatus to provide a global positioning system receiver is described. The Personal navigation system includes at least one motion sensor, the motion sensor capable of identifying a user activity, and distinguishing between walking and driving, or other manual v. mechanical locomotion. The system automatically switches modes to the appropriate format.

24 Claims, 14 Drawing Sheets

(56) References Cited

U.S. PATENT DOCUMENTS

| | | | |
|---|---|---|---|
| 6,428,490 B1 | 8/2002 | Kramer et al. | |
| 6,493,652 B1 | 12/2002 | Ohlenbusch et al. | |
| 6,496,695 B1 | 12/2002 | Kouji et al. | |
| 6,513,381 B2 | 2/2003 | Fyfe et al. | |
| 6,522,266 B1 | 2/2003 | Soehren et al. | |
| 6,532,419 B1 | 3/2003 | Begin et al. | |
| 6,539,336 B1 | 3/2003 | Vock et al. | |
| 6,611,789 B1 | 8/2003 | Darley | |
| 6,672,991 B2 | 1/2004 | O'Malley | |
| 6,685,480 B2 | 2/2004 | Nishimoto et al. | |
| 6,700,499 B2 | 3/2004 | Kubo et al. | |
| 6,786,877 B2 | 9/2004 | Foxlin | |
| 6,790,178 B1 | 9/2004 | Mault et al. | |
| 6,813,582 B2 | 11/2004 | Levi et al. | |
| 6,823,036 B1 | 11/2004 | Chen | |
| 6,826,477 B2 | 11/2004 | Ladetto et al. | |
| 6,836,744 B1 | 12/2004 | Asphahani et al. | |
| 6,881,191 B2 | 4/2005 | Oakley et al. | |
| 6,885,971 B2 | 4/2005 | Vock et al. | |
| 6,898,550 B1 | 5/2005 | Blackadar et al. | |
| 6,928,382 B2 | 8/2005 | Hong et al. | |
| 6,941,239 B2 | 9/2005 | Unuma et al. | |
| 6,959,259 B2 | 10/2005 | Vock et al. | |
| 6,975,959 B2 | 12/2005 | Dietrich et al. | |
| 7,010,332 B1 | 3/2006 | Irvin et al. | |
| 7,020,487 B2 | 3/2006 | Kimata | |
| 7,054,784 B2 | 5/2006 | Flentov et al. | |
| 7,057,551 B1 | 6/2006 | Vogt | |
| 7,072,789 B2 | 7/2006 | Vock et al. | |
| 7,092,846 B2 | 8/2006 | Vock et al. | |
| 7,148,797 B2 | 12/2006 | Albert | |
| 7,155,507 B2 | 12/2006 | Hirano et al. | |
| 7,158,912 B2 | 1/2007 | Vock et al. | |
| 7,169,084 B2 | 1/2007 | Tsuji | |
| 7,171,331 B2 | 1/2007 | Vock et al. | |
| 7,173,604 B2 | 2/2007 | Marvit et al. | |
| 7,177,684 B1 | 2/2007 | Kroll et al. | |
| 7,200,517 B2 | 4/2007 | Darley et al. | |
| 7,212,943 B2 | 5/2007 | Aoshima et al. | |
| 7,220,220 B2 | 5/2007 | Stubbs et al. | |
| 7,254,516 B2 | 8/2007 | Case et al. | |
| 7,297,088 B2 | 11/2007 | Tsuji | |
| 7,328,611 B2 | 2/2008 | Klees et al. | |
| 7,334,472 B2 | 2/2008 | Seo et al. | |
| 7,353,112 B2 | 4/2008 | Choi et al. | |
| 7,387,611 B2 | 6/2008 | Inoue et al. | |
| 7,397,357 B2 | 7/2008 | Krumm et al. | |
| 7,428,471 B2 | 9/2008 | Darley et al. | |
| 7,451,056 B2 | 11/2008 | Flentov et al. | |
| 7,457,719 B1 | 11/2008 | Kahn et al. | |
| 7,467,060 B2 | 12/2008 | Kulach et al. | |
| 7,512,515 B2 | 3/2009 | Vock et al. | |
| 7,526,402 B2 | 4/2009 | Tanenhaus et al. | |
| 7,608,050 B2 | 10/2009 | Shugg | |
| 7,617,071 B2 | 11/2009 | Darley et al. | |
| 7,640,134 B2 | 12/2009 | Park et al. | |
| 7,640,804 B2 | 1/2010 | Daumer et al. | |
| 7,647,196 B2 | 1/2010 | Kahn et al. | |
| 7,653,508 B1 | 1/2010 | Kahn et al. | |
| 7,752,011 B2 | 7/2010 | Niva et al. | |
| 7,774,156 B2 | 8/2010 | Niva et al. | |
| 7,857,772 B2 | 12/2010 | Bouvier et al. | |
| 7,881,902 B1 | 2/2011 | Kahn et al. | |
| 7,889,085 B2 | 2/2011 | Downey et al. | |
| 7,892,080 B1 | 2/2011 | Dahl | |
| 7,962,312 B2 | 6/2011 | Darley et al. | |
| 7,987,070 B2 | 7/2011 | Kahn et al. | |
| 2001/0027375 A1 | 10/2001 | Machida | |
| 2002/0023654 A1 | 2/2002 | Webb | |
| 2002/0027164 A1 | 3/2002 | Mault et al. | |
| 2002/0089425 A1 | 7/2002 | Kubo et al. | |
| 2002/0109600 A1 | 8/2002 | Mault et al. | |
| 2002/0118121 A1 | 8/2002 | Lehrman et al. | |
| 2002/0142887 A1 | 10/2002 | O'Malley | |
| 2002/0151810 A1 | 10/2002 | Wong et al. | |
| 2003/0018430 A1 | 1/2003 | Ladetto et al. | |
| 2003/0048218 A1 | 3/2003 | Milnes et al. | |
| 2003/0083596 A1 | 5/2003 | Kramer et al. | |
| 2003/0093187 A1 | 5/2003 | Walker | |
| 2003/0109258 A1 | 6/2003 | Mantyjarvi et al. | |
| 2003/0139692 A1 | 7/2003 | Barrey et al. | |
| 2003/0149526 A1 | 8/2003 | Zhou et al. | |
| 2004/0204840 A1 | 10/2004 | Hasima | |
| 2004/0219910 A1 | 11/2004 | Beckers | |
| 2004/0225467 A1 | 11/2004 | Vock et al. | |
| 2004/0236500 A1 | 11/2004 | Choi et al. | |
| 2005/0033200 A1 | 2/2005 | Soehren et al. | |
| 2005/0079873 A1 | 4/2005 | Caspi et al. | |
| 2005/0107944 A1 | 5/2005 | Hovestadt et al. | |
| 2005/0131736 A1 | 6/2005 | Nelson et al. | |
| 2005/0202934 A1 | 9/2005 | Olrik et al. | |
| 2005/0222801 A1 | 10/2005 | Wulff et al. | |
| 2005/0232388 A1 | 10/2005 | Tsuji | |
| 2005/0232404 A1 | 10/2005 | Gaskill | |
| 2005/0234637 A1* | 10/2005 | Obradovich et al. | 701/200 |
| 2005/0238132 A1 | 10/2005 | Tsuji | |
| 2005/0240375 A1 | 10/2005 | Sugai | |
| 2005/0248718 A1 | 11/2005 | Howell et al. | |
| 2006/0020177 A1 | 1/2006 | Seo et al. | |
| 2006/0063980 A1 | 3/2006 | Hwang et al. | |
| 2006/0064276 A1 | 3/2006 | Ren et al. | |
| 2006/0080551 A1 | 4/2006 | Mantyjarvi et al. | |
| 2006/0100546 A1 | 5/2006 | Silk | |
| 2006/0136173 A1 | 6/2006 | Case et al. | |
| 2006/0161377 A1 | 7/2006 | Rakkola et al. | |
| 2006/0167387 A1 | 7/2006 | Buchholz et al. | |
| 2006/0206258 A1 | 9/2006 | Brooks | |
| 2006/0223547 A1 | 10/2006 | Chin et al. | |
| 2006/0259268 A1 | 11/2006 | Vock et al. | |
| 2006/0284979 A1 | 12/2006 | Clarkson | |
| 2006/0288781 A1 | 12/2006 | Daumer et al. | |
| 2007/0037605 A1 | 2/2007 | Logan et al. | |
| 2007/0038364 A1 | 2/2007 | Lee | |
| 2007/0061105 A1 | 3/2007 | Darley et al. | |
| 2007/0063850 A1 | 3/2007 | Devaul et al. | |
| 2007/0067094 A1 | 3/2007 | Park et al. | |
| 2007/0073482 A1 | 3/2007 | Churchill et al. | |
| 2007/0082789 A1 | 4/2007 | Nissila et al. | |
| 2007/0125852 A1 | 6/2007 | Rosenberg | |
| 2007/0130582 A1 | 6/2007 | Chang et al. | |
| 2007/0142715 A1 | 6/2007 | Banet et al. | |
| 2007/0208531 A1 | 9/2007 | Darley et al. | |
| 2007/0213126 A1 | 9/2007 | Deutsch et al. | |
| 2007/0250261 A1 | 10/2007 | Soehren | |
| 2007/0260418 A1 | 11/2007 | Ladetto et al. | |
| 2007/0260482 A1 | 11/2007 | Nurmela et al. | |
| 2008/0024364 A1* | 1/2008 | Frederick Taylor | 342/357.13 |
| 2008/0059061 A1 | 3/2008 | Lee | |
| 2008/0140338 A1 | 6/2008 | No et al. | |
| 2008/0165737 A1 | 7/2008 | Uppala | |
| 2008/0167801 A1 | 7/2008 | Geelen | |
| 2008/0171918 A1 | 7/2008 | Teller et al. | |
| 2008/0231713 A1 | 9/2008 | Florea et al. | |
| 2008/0311929 A1 | 12/2008 | Carro et al. | |
| 2009/0043531 A1 | 2/2009 | Kahn et al. | |
| 2009/0047645 A1 | 2/2009 | Dibenedetto et al. | |
| 2009/0082994 A1 | 3/2009 | Schuler et al. | |
| 2009/0138200 A1 | 5/2009 | Hunter | |
| 2009/0213002 A1 | 8/2009 | Rani et al. | |
| 2009/0216704 A1 | 8/2009 | Zheng et al. | |
| 2009/0234614 A1 | 9/2009 | Kahn et al. | |
| 2009/0319221 A1 | 12/2009 | Kahn et al. | |
| 2010/0056872 A1 | 3/2010 | Kahn et al. | |
| 2010/0057398 A1 | 3/2010 | Darley et al. | |
| 2011/0066364 A1* | 3/2011 | Hale | 701/201 |

OTHER PUBLICATIONS

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

(56) References Cited

OTHER PUBLICATIONS

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing MEMS Accelerometers and Low Power Microcontroller," IEEE EMBS Special Topic Conference on Microtechnologies in Medicine and Biology, May 12-15, 2005, pp. 92-93.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

Healey, Jennifer, et al, "Wearable Wellness Monitoring Using ECG and Accelerometer Data," IEEE Int. Symposium on Wearable Computers (ISWC'05), 2005, 2 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.

Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.

Milenkovic, Milena, et al, "An Accelerometer-Based Physical Rehabilitation System," IEEE SouthEastern Symposium on System Theory, 2002, pp. 57-60.

Otto, Chris, et al, "System Architecture of a Wireless Body Area Sensor Network for Ubiquitous Health Monitoring," Journal of Mobile Multimedia, vol. 1, No. 4, 2006, pp. 307-326.

Park, Chulsung, et al, "Eco: An Ultra-Compact Low-Power Wireless Sensor Node for Real-Time Motion Monitoring," IEEE Int. Symp. on Information Processing in Sensor Networks, 2005, pp. 398-403.

Shen, Chien-Lung, et al, "Wearable Band Using a Fabric-Based Sensor for Exercise ECG Monitoring," IEEE Int. Symp. on Wearable Computers, 2006, 2 pages.

Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.

Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.

Wu, Winston H, et al, "Context-Aware Sensing of Physiological Signals," IEEE Int. Conf. on Engineering for Medicine and Biology, Aug. 23-26, 2007, pp. 5271-5275.

International Search Report and Written Opinion, PCT/US/09/55558, mailed Oct. 22, 2009, 11 pages.

"Sensor Fusion," www.u-dynamics.com, 2 pages.

Wang, Shu, et al, "Location Based Services for Mobiles: Technologies and Standards, LG Electronics MobileComm," IEEE ICC 2008, Beijing, pp. 1-66 (part 1 of 3).

Wang, Shu, et al, "Location Based Services for Mobiles: Technologies and Standards, LG Electronics MobileComm," IEEE ICC 2008, Beijing, pp. 67-92 (part 2 of 3).

Wang, Shu, et al, "Location Based Services for Mobiles: Technologies and Standards, LG Electronics MobileComm," IEEE ICC 2008, Beijing, pp. 93-123 (part 3 of 3).

Weckesser, P, et al, "Multiple Sensorprocessing for High-Precision Navigation and Environmental Modeling with a Mobile Robot," IEEE, 1995, pp. 453-458.

Yoo, Chang-Sun, et al, "Low Cost GPS/INS Sensor Fusion System for UAV Navigation," IEEE, 2003, 9 pages.

PCT/US2011/024022, International Search Report and Written Opinion, mailed Mar. 15, 2011, 9 pages.

Extended European Search Report and Search Opinion for Application No. 11732166.1, dated Jul. 14, 2014, (9 pages).

\* cited by examiner

Motorized Vehicle Navigation:
    observe directionality
    calculate fastest route
    prefer freeways and express ways
    utilize traffic levels

Muscle Powered Vehicle Navigation:
    avoid freeways and express ways
    prefer routes with bike lanes
    able to cut across parks and other locations with bike/walking paths
    need not observe directionality
    observe traffic levels

Ambulatory Navigation:
    shortest route
    prefer minimal vertical change
    avoid freeways and expressways
    need not observe directionality
    need not adjust based on traffic levels
    able to cut across walking paths, parks, and open space
    able to use stairs
    route potentially can include public transport

METHOD AND APPARATUS FOR AN INTEGRATED PERSONAL NAVIGATION SYSTEM

FIELD OF THE INVENTION

The present invention relates to a navigation system, and more particular to an improved personal navigation system.

BACKGROUND

Global Positioning System (GPS) is a satellite based navigation system that provides positioning, navigation, and timing services to worldwide users on a continuous basis. GPS is made up of three parts: orbiting satellites, control and monitoring stations, and GPS receivers. A GPS receiver obtains signals from at least two GPS satellites to calculate three-dimensional location (latitude, longitude, and altitude) plus the time.

GPS is becoming more popular. GPS receivers designed to be mounted in cars and boats are common. In addition to such dedicated GPS receivers, GPS is becoming available for mobile devices which have the capability of receiving GPS signals and calculating the location data.

SUMMARY

A method and apparatus to provide a personal navigation system is described. The Personal navigation system includes at least one motion sensor, the motion sensor capable of identifying a user activity, and distinguishing between walking and driving, or other manual v. mechanical locomotion. In one embodiment, the motion sensor is an inertial sensor, such as an accelerometer. The personal navigation system to automatically switch modes to the appropriate format, the mode reflecting the type of locomotion.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B illustrates a table of exemplary differentiators between modes.

DETAILED DESCRIPTION

The method and apparatus described is a personal navigation system. In one embodiment, the mobile positioning enabled device includes an assisted global position system (A-GPS) receiver, and including at least one motion sensor. A-GPS is a global umbrella term referring to using global positioning satellites, network triangulation, wireless network data signal based location calculations and other systems. In another embodiment, another position determination system is used. In one embodiment, the motion sensor is an accelerometer.

The Personal navigation system in one embodiment has multiple modes, representing various forms of travel. In one embodiment, the modes include motorized vehicle travel (e.g., driving in a car, motorcycle, bus, etc.), riding in a muscle powered vehicle (e.g., bicycle, reclining bike, etc.) and ambulatory motion (e.g., walking, jogging). Alternative modes may be defined, e.g. other modes of travel with different constraints in terms of navigation (flying, boating, etc. may be included, in one embodiment). The personal navigation system uses sensor data to determine the mode, and provide mode-appropriate directions and maps. In one embodiment, the map tiles displayed may be mode-appropriately modified, e.g. showing pedestrian paths or sidewalks when in ambulatory mode v. showing speed limits when in drive mode. In one embodiment, the map data is made accessible in a hybrid way, combining live search and server access with caching and local storage. This enables a small download, without irrelevant maps, while providing a seamless map experience when the network is temporarily inaccessible.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
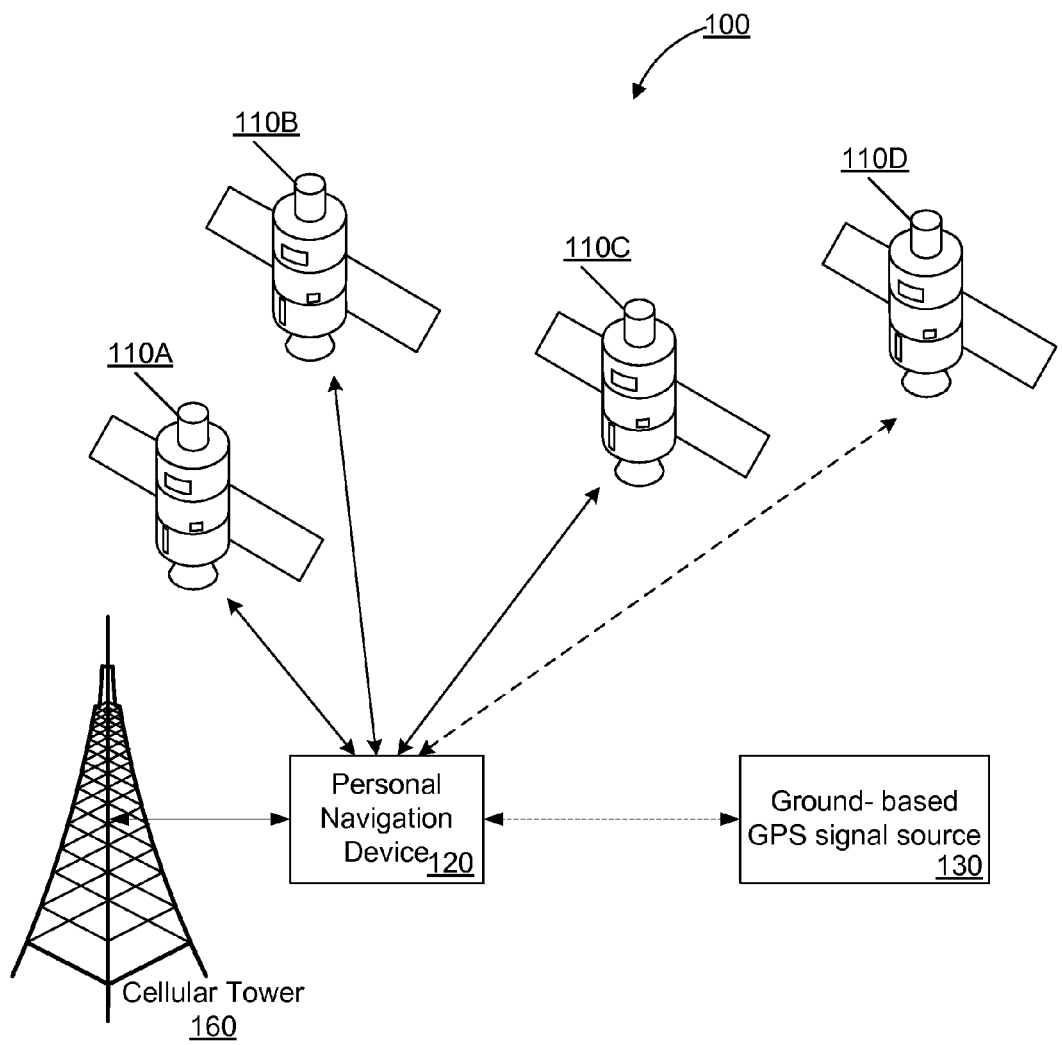
FIG. 1 is a network diagram showing one embodiment of a global positioning system 100.

FIG. 1 is a network diagram showing one embodiment of a global positioning system 100. The system 100 includes a global positioning system (GPS) receiver 120, which receives GPS signals from a plurality of GPS satellites, such as satellites 110A-D, and/or one or more ground-based GPS signal sources, such as GPS signal source 130. GPS enabled device 120 utilizes the GPS signals to triangulate its position in a manner well known in the art. The GPS enabled device 120 may be a handheld GPS device (e.g., a GPS enabled cellular phone, PDA, etc.), a GPS enabled navigation device (e.g., a TOMTOM™, GARMIN™, MAGELLAN™, or other navigation system), a self-navigating vehicle, or other device which utilizes GPS data for location determination.

In one embodiment, the personal navigation device is GPS enabled device 120 which utilizes three or more signals (from satellites 110A, 110B, and 110C, for example) to determine a longitude and latitude of GPS enabled device's current location. In another embodiment, GPS enabled device 120 utilizes four satellite signals (from satellites 110A-D for example) to determine a longitude, latitude, and altitude of GPS enabled device's current location. In one embodiment, GPS enabled device 120 makes successive location calculations to determine additional information, such as, for example, GPS enabled device's speed, bearing, track, trip distance, route, etc. The GPS enabled device 120 may use a mapping function in conjunction with the location data from the GPS signals. In one embodiment, the personal navigation device 120 further utilizes additional data from networks (cellular tower 160), wireless signals (not shown), etc. This is referred to as A-GPS, or GPS in the below discussion.

As will be discussed in greater detail below, in one embodiment, the personal navigation system may include the GPS enabled device 120 as well as one or more sensors. In one embodiment, the sensors include one or more inertial sensors, such as accelerometers and gyroscopes (not shown). The inertial sensors allow the GPS enabled device 120 to determine the user's state, and calculate the user's location based on acceleration and time calculations. In one embodiment, additional sensors may include a magnetometer (magnetic compass) to track heading information, a barometer or pressure sensor to track changes in altitude. The data from these sensors may be used to provide sensor sensor based location and navigation. The location determination based on the GPS signals, may then be compared against the sensor-based prediction in one embodiment. Furthermore, the location determination based on the sensors may be used as a solution when the GPS enabled device 120 is not receiving GPS signals.

Figure 2A:
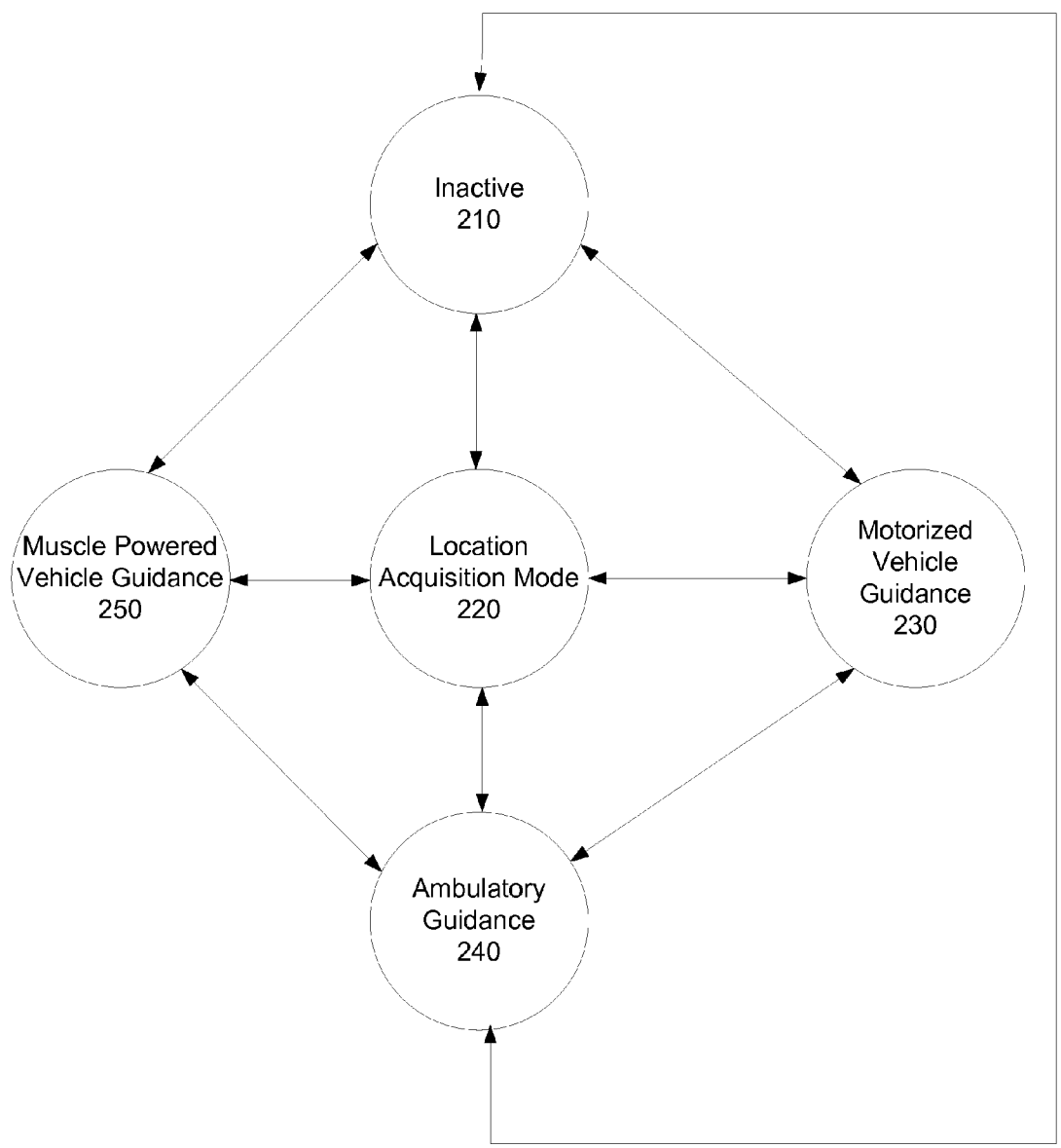
FIG. 2A illustrates one embodiment of the modes of the Personal navigation system, and transitions between modes.

FIG. 2A illustrates a state diagram of one embodiment of the modes of the personal navigation system, and transitions between modes. The modes, in one embodiment are: inactive 210, location acquisition mode 220, motorized vehicle guidance 230, ambulatory guidance 240, muscle powered vehicle guidance 250. These are merely exemplary modes, and other modes may be utilized. In another embodiment, one or more of the modes may be combined (e.g. motorized and muscle powered vehicle may be combined into a single mode).

Inactive mode 210 is when location acquisition is not active. This may be the case when the device is disabled, or set not to acquire location signals or sensor-based location calculations.

Location acquisition mode 220 is active when the mobile positioning calculations are taking place, but no directions have been requested. In many cases, users wish to simply see their own position on a map, without navigation/directions. This is the mode that enables that. From the location acquisition mode 220, the system can move to one of three guidance modes.

Motorized vehicle guidance 230 provides guidance for a car, bus, or other vehicle. As noted in FIG. 2B, in one embodiment this requires observation of road directionality (e.g. one way streets, turns being available, etc.). Furthermore, in general for motorized vehicle guidance 230, the system prefers freeways and expressways over city streets, and routes over the fastest route. In one embodiment, when available the system also takes traffic into consideration. In one embodiment real-time traffic information may be received. In another embodiment, statistical traffic patterns may be used. Such statistical traffic patterns reflect known traffic patterns associated with the location and time of day. In one embodiment, a traffic database such as NAVTEQ TRAFFIC PATTERNS™ may be used.

In contrast, ambulatory guidance 240 is for walking, or other ambulatory motion (e.g. roller skating, jogging, etc.) Ambulatory motion mode, in one embodiment avoids freeways, expressways, and other paths without a pedestrian walking option. It generally optimizes for shortest route, with minimal vertical change. This makes walking the path easier. In one embodiment, ambulatory navigation further provides the ability to use stairs, cut across parks and open spaces, and ignore directionality of streets. In one embodiment, ambulatory guidance mode further ignores traffic levels, as generally pedestrians are not directly impacted by traffic levels.

In one embodiment, ambulatory guidance 240 can incorporate the use of public transportation—e.g. bus, subway, etc. Since these routes are constrained, no guidance is necessary for the portion of the route which incorporates such public transportation options.

Muscle powered vehicle navigation 230 is between ambulatory vehicle navigation and motorized vehicle navigation in aim. Generally speaking muscle powered vehicles include bicycles, surreys, and other pedaled or muscle powered vehicles. While generally such vehicles do travel on the street, and therefore observe directionality, they can also cut across parks, use bicycle lanes, cross streets at the cross walk, and otherwise utilize paths not accessible to motorized vehicles.

In one embodiment, the user may adjust these preferences for each mode. In one embodiment, the user may add further constraints to certain modes, if available. For example, the user may prefer to observe traffic patterns for ambulatory navigation as well, because he or she prefers to avoid streets with high traffic levels.

Figure 3:
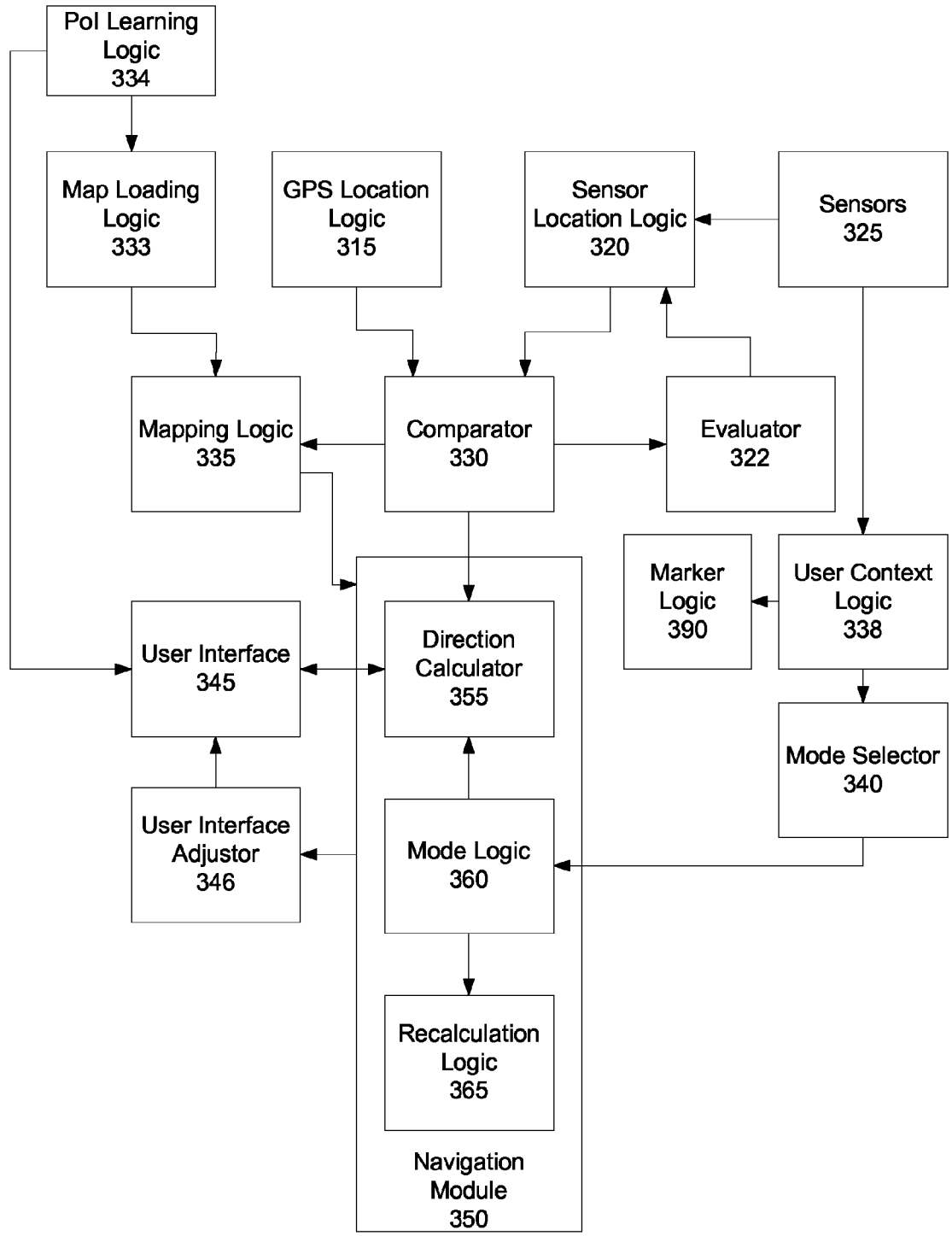
FIG. 3 is a block diagram of one embodiment of a personal navigation system in accordance with the present invention.

FIG. 3 is a block diagram of one embodiment of a personal navigation system in accordance with the present invention. A-GPS location logic 315 receives A-GPS data (not shown). A-GPS location logic 315 calculates location, speed and direction of travel, and any other relevant A-GPS-based information. In one embodiment, the personal navigation system may include alternative location logics, now known or developed in the future.

Sensor location logic 320 receives data from sensors 325. Sensors 325 may include inertial sensors such as accelerometers, gyroscopes, and other sensors that provide motion information. Furthermore, sensors 325 may also include magnetometers, barometers or other pressure sensors, thermometers or other temperature sensors, etc. In one embodiment, sensors may further include network triangulation data sensors, if the personal navigation system is also a mobile telephone or has cellular signal receiving capability. The network triangulation data provides location information based on the relationship of the mobile telephone to one or more antenna to determine an approximate location. Its data can also be used in conjunction with the accelerometer, and other sensor data by sensor location logic 320 to determine a location, and speed and direction of travel.

Comparator 330 compares the location, speed, and heading data from the A-GPS location logic 315 and the sensor location logic 320. In general, it is expected that the values from these two location logics 315, 320 would be equal within the margin of error. The comparator 330 determines if that is the case. If not, in one embodiment the comparator 322 alerts evaluator 322. It is generally assumed that if there is a discrepancy between A-GPS-derived data and sensor derived data, the sensor location logic 320 is making the erroneous calculation. In one embodiment, this is assured by waiting for a discrepancy to be repeated over a period of time, or over at least different satellite readings (e.g. to ensure that the error is not originated by a satellite or pseudolite errors in the A-GPS system). The evaluator 322 may tune the sensor location logic 320 to ensure that the system generates correct location, heading, and speed data. In one embodiment, if data from one source is not available (e.g. GPS is temporarily not available because of reception issues), the other source may be used.

The output of the comparator 330 is the final location, heading, speed, and other related data. This data may be passed to mapping logic 335. Mapping logic 335 utilizes the location and map data, as is known in the art, to provide map location information to the user. Mapping logic 335 obtains map tiles, or other map subsets, from map loading logic 333.

Map loading logic 333 may obtain these map tiles from memory or from a server. In one embodiment, map loading logic 333 utilizes predictive loading to provide a hybrid system which combines the benefit of on-board map data with the benefits of live server updates. By having a hybrid map loading logic 333 produces an application having a reduced install size, and memory requirement, and yet providing up-to-date information and mapping even when server connection is not available. Map loading logic 333 in embodiment further loads Point of Interest information. Point of Interest, or PoI, represents locations on the map tiles which may be of interest to the user. In general, points of interest include restaurants, coffee shops, parking locations, stores, etc. The concept of points of interest on a map is well known.

PoI learning logic enables the system to analyze user information, to determine which points of interest should be loaded via map loading logic 333. In one embodiment, PoI learning logic 334 further may be used to flag points of interest on the map, to provide alerts or directions to the user for points of interests which have historically been of interest to the user. For example, if a user consistently asks for directions to a particular coffee shop or chain restaurant, it would be useful to provide pro-actively directions to those locations. Thus, in one embodiment when the user is driving, the points of interest which have been identified as of particular relevance may be indicated on the map. In one embodiment, starts or similar icons may be shown. Additionally, or alternately, a logo or text may be used, or a verbal announcement may be made. In one embodiment, the PoI learning logic 334 takes into account the trip of the user. For example, in one embodiment on a longer trip (as determined by the directions requested, or by the length of the drive determined by the system) the points of interest would be shown after a certain amount of time has elapsed. In one embodiment, these preferences may be set by the user.

In one embodiment, map loading logic 333 opportunistically updates its data when connected to high bandwidth, low data cost connections (e.g. a wireless connection, or a cable connection to a computer system which has a connection to the Internet). Depending on the data plan used, users often pay high data rates for cellular connections but fixed rates for their home network connections. The personal navigation system, in one embodiment, minimizes communication with the server when connected via a cellular connection, and performs large data downloads and map synchronization when connected to the server via a wireless network connection, a cable connection to a computer, or another low cost connection.

Navigation module 350 can be used to generate directions for the user. The navigation module 350 includes direction calculator 355. Direction calculator calculates directions, in one embodiment based on a destination (as selected or entered by the user) and an origination point (either a current location, or as selected or entered by the user). In one embodiment, direction calculator 355 uses mode logic 360 to determine what type of directions should be provided, directions for walking, driving, bicycling, etc. In one embodiment, mode logic 360 provides the direction calculation factors to direction calculator 355. For example, one or more of the factors described above with respect to FIG. 2B may be provided.

The actual mode selection is done by mode selector 340. Mode selector 340 receives data from user context logic 338. User context logic 338 receives sensor data from sensors 325, and uses this information to evaluate the user's current activity. In one embodiment, user context logic 338 attempts to deduce a logical chain of actions based on the user's current actions (as detected by sensors 325) and past actions. For example, based on a user setting a first waypoint for a restaurant and a second waypoint for a movie theater, the user context logic 338 determines that the user is intending to go to a restaurant and then a movie. This can be used to automatically initiate guidance to the movie theater after dinner, or guidance back to the vehicle of the movie theater is too far to walk. In one embodiment, the system may even utilize external data, e.g. the user purchased tickets to a particular show, to further determine user context (e.g. a need to hurry to get to the theater in time for the start of the movie).

The mode selector 340 uses the user context to determine whether user is driving, walking, bicycling, or using another mode of motion. Based on the mode determination, mode selector 340 provides the current mode to mode logic 360.

Mode logic 360 may cause a recalculation of directions, using recalculation logic 365, when a change in mode is detected. For example, if directions are provided while the user is driving in a car, and then the user parks the car and steps out, the mode selector 340 determines that the user is now walking, and mode logic 360 causes a recalculation of the directions, to optimize for walking directions to the destination. This does not require the user to re-enter the destination, and request a recalculation or otherwise interact with the system. In one embodiment, such changes of mode are announced by the system—via voice (sound), display (image), vibration (motion), or all of these notification means—and the user may cancel the change.

The user interface 345 is the interaction with the user, which may include visual, aural, and tactile interface elements. For example, providing directions may include displaying a map with an arrow (visual), verbal announcements (aural), and vibrations for indicators (tactile).

In one embodiment, the user interface 345 may be adjusted based on the mode and device location, by user interface adjustor 346. User interface adjustor 346 may control the types of features used, and their strength/volume. For example, if the device is the user's pocket, and the user is walking, visual cues are not useful. Therefore, the user interface adjustor 346 may turn off the visual navigation, and utilize verbal and/or tactile feedback to the user. This can provide power savings, as well as optimizing the user experience.

In one embodiment, when the system determines that a user has driven past a destination, the system does not stop providing directions, or erase the destination. Rather, the system continues to provide routing to the destination. In one embodiment, the system asks the user whether the user wishes the system to recalculate the route, since the destination has been passed. In another embodiment, the system waits until a change of mode is detected, and then automatically recalculates the route to the destination for the new mode. In one embodiment, the system continues routing, and re-routing when necessary, until the user stops moving at the destination. This ensures that the user does not have to re-enter the request, in order to continue routing if he or she has to go past the destination, for example, to find parking.

In one embodiment, the system can create markers using marker logic 390. In one embodiment, these markers may be manually created by a user. In one embodiment, user context logic 338 may provide data to marker logic 390 to automatically create markers, when the user context logic 338 determines that this is a location to which the user may wish to return in the short term. For example, when the user parks his or her car (having driven past a destination), and gets out of the car, the user context logic 338 would determine this, and use marker logic 390 to mark the parking location. When the user leaves the destination, for example, the restaurant after a meal, the system may automatically indicate to the user that guidance to the parking location can be provided. The user may choose to initiate that guidance. In one embodiment, the system may verbally announce that such guidance is available (e.g. would you like to return to your parking location?) The user may in one embodiment reject the suggestion through a simple gesture interface, such as shaking the device.

The marking, in one embodiment, utilizes location and sensor data. In one embodiment, the parking location may be sufficiently well marked (using location and other sensors) that the user can be guided to the correct floor and the correct location in a parking garage for the vehicle.

In this way, the personal navigation system not only uses GPS and sensor data to cross-verify, but also can provide location and navigation when one or other source is not available. Furthermore, by automatically detecting the user's mode of motion, the system provides optimized directions. Furthermore, in one embodiment, the user can be guided to their destination even if it takes multiple types of transport (e.g. drive to the location, drive to a parking spot, walk back to the location). The system is designed to provide data intelligently to the user. By determining the user's current activity, and analyzing expected behaviors, the system can provide a comprehensive personal navigation system.

Figure 4:
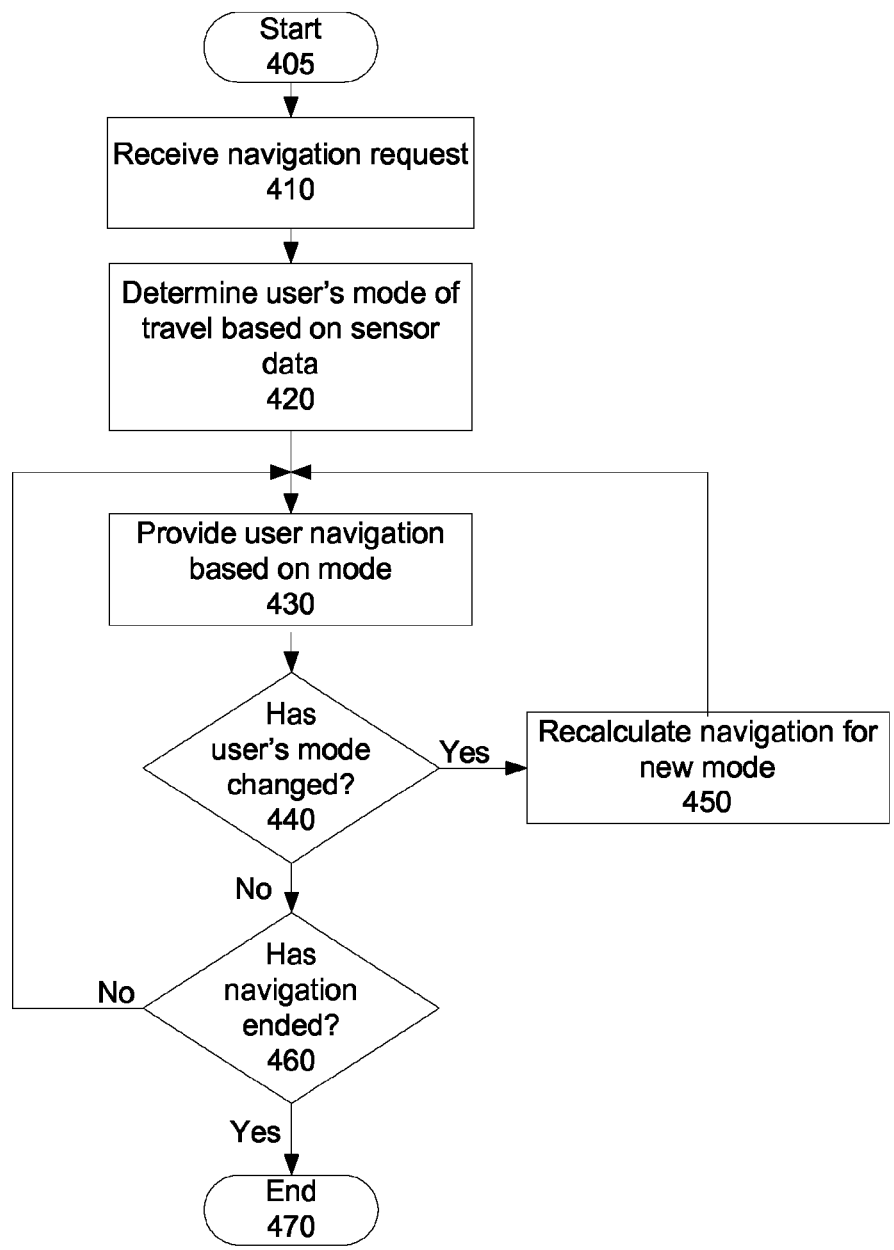
FIG. 4 is an overview flowchart of utilizing the personal navigation system.

FIG. 4 is an overview flowchart of utilizing the personal navigation system. The process starts at block 410, when a navigation request is received. The navigation request is generally a request to provide directions from a first point to a second point. In many cases, the first point is a current location of the requesting user.

At block 420, a user's mode of travel is determined based on sensor data. In one embodiment, the mode of travel may include motorized vehicle, muscle powered vehicle, and ambulatory motion. The sensor determines the mode of travel based on accelerations observed. This is described in more detail below.

At block 430, the user is provided navigation based on the identified mode. In one embodiment, the user may override the identified mode manually.

At block 440, the process determines whether the user's mode of motion has changed. In one embodiment, the sensor continuously monitors motion. If the mode changes, e.g. the user stops walking and starts driving or vice versa, the mode change is detected. At block 450, the navigation is recalculated for the new mode. The process then returns to block 430 to continue providing user navigation based on the mode.

If the user mode has not changed, the process continues to block 460. At block 460, the process determines whether user navigation has ended. If not, the process returns to block 430, to continue to provide user navigation. Otherwise, the process ends at block 470.

This simple flow illustrates an overview of the activities performed by one embodiment of the system. In addition detecting the user's mode of travel and providing mode-specific navigation the system may further include other features. Note that while the processes herein are illustrated as flowcharts, the sequence of the blocks need not reflect the sequence of actions taken. For example, in on embodiment, the system continuously monitors sensor data to determine mode changes. Furthermore, in one embodiment, one or more of the blocks may be left out.

Figure 5:
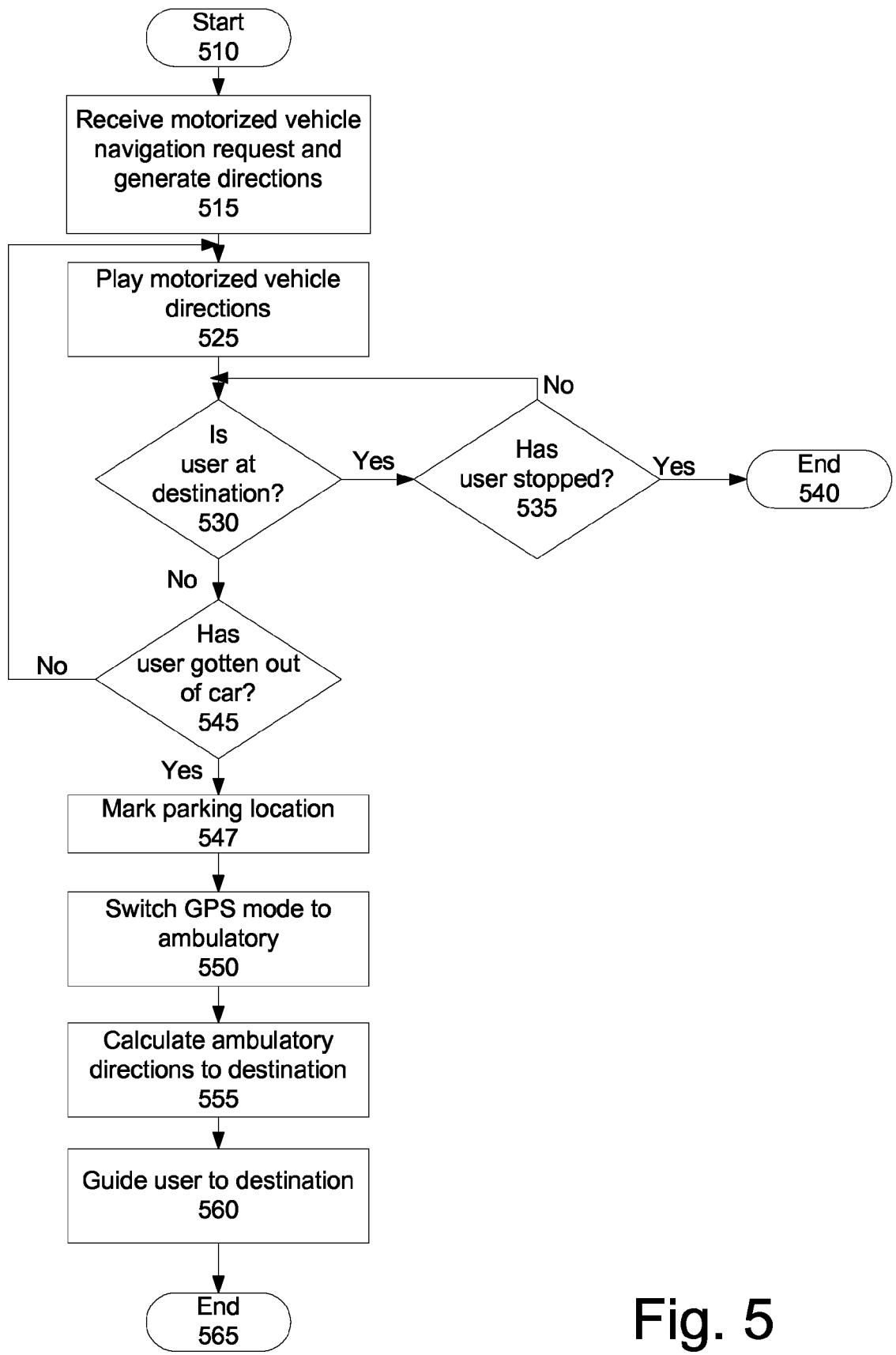
FIG. 5 is a flowchart of one embodiment of utilizing the mode change system.

FIG. 5 is a flowchart of one embodiment of utilizing the mode change system. The process starts at block 510. At block 515, a motorized vehicle navigation request is received.

Of course, one of skill in the art would understand that the opposite mode transition can be similarly received. Directions are generated based on the navigation request.

At block 525, the motorized vehicle directions are played. In one embodiment, directions may be provided verbally (e.g. Drive straight for one mile. Tend right. Turn at the next light, etc.) In one embodiment, the directions may also be shown visually. Visual directions may include text and/or illustrations on the map. In one embodiment, the map illustrations show an icon for the car progressing along the path. In one embodiment, the path shown is generated based on map tiles downloaded from the server.

At block 530, the process determines whether the user is at his or her destination. If so, at block 535, the process determines whether the user has stopped. If the user has stopped, the process ends at block 540. Otherwise, the process continues to provide directions. This ensures that if a user drives to a destination and then passes by in order to find parking, or because he or she missed the destination location, the system does not stop providing directions until the user has actually come to a stop at the destination.

If the user is not yet at the destination, the process continues to block 545. At block 545, the process determines whether the user has gotten out of the car. In one embodiment, this is determined based on sensor data. For example, the movement of standing up out of a car is characteristic. Furthermore, this generally occurs in conjunction with the car's movement stopping for at least a predetermined time, and the engine being turned off. This combination of events can be recognized by the system as "the user is stopping the car and getting out." If the user is not getting out of the car the process returns to block 525 to continue giving driving directions. Otherwise the process continues to block 547. At block 547, the process marks the location, as the parking location of the vehicle. This enables the system to provide directions back to the user's vehicle. In one embodiment, the marking may include elevation as well as location. The elevation data may be used to guide a user to the proper floor of a multi-floor building. The process then continues to block 550.

At block 550, the system switches the mode to ambulatory. The directions are recalculated, in one embodiment, for ambulatory motion, at block 555, and the user is guided to the destination, at block 560. As noted above, this means that street directionality can be ignored, and various walking paths can be utilized. In some cases, this may also mean that the user can be directed to walk through a building, rather than around it. The process then ends at block 565.

Note that in general, the end of the set of directions provided is at least a few steps of walking since people do not calculate directions to a particular parking spot. Therefore, in one embodiment, the system expects an ambulatory navigation to end the directions. In one embodiment, the system may pre-calculate the ambulatory directions in the vicinity of the destination on the server, and send them to the personal navigation system. This would enable the personal navigation system to provide the ambulatory directions even if a server connection is temporarily unavailable.

Figure 6:
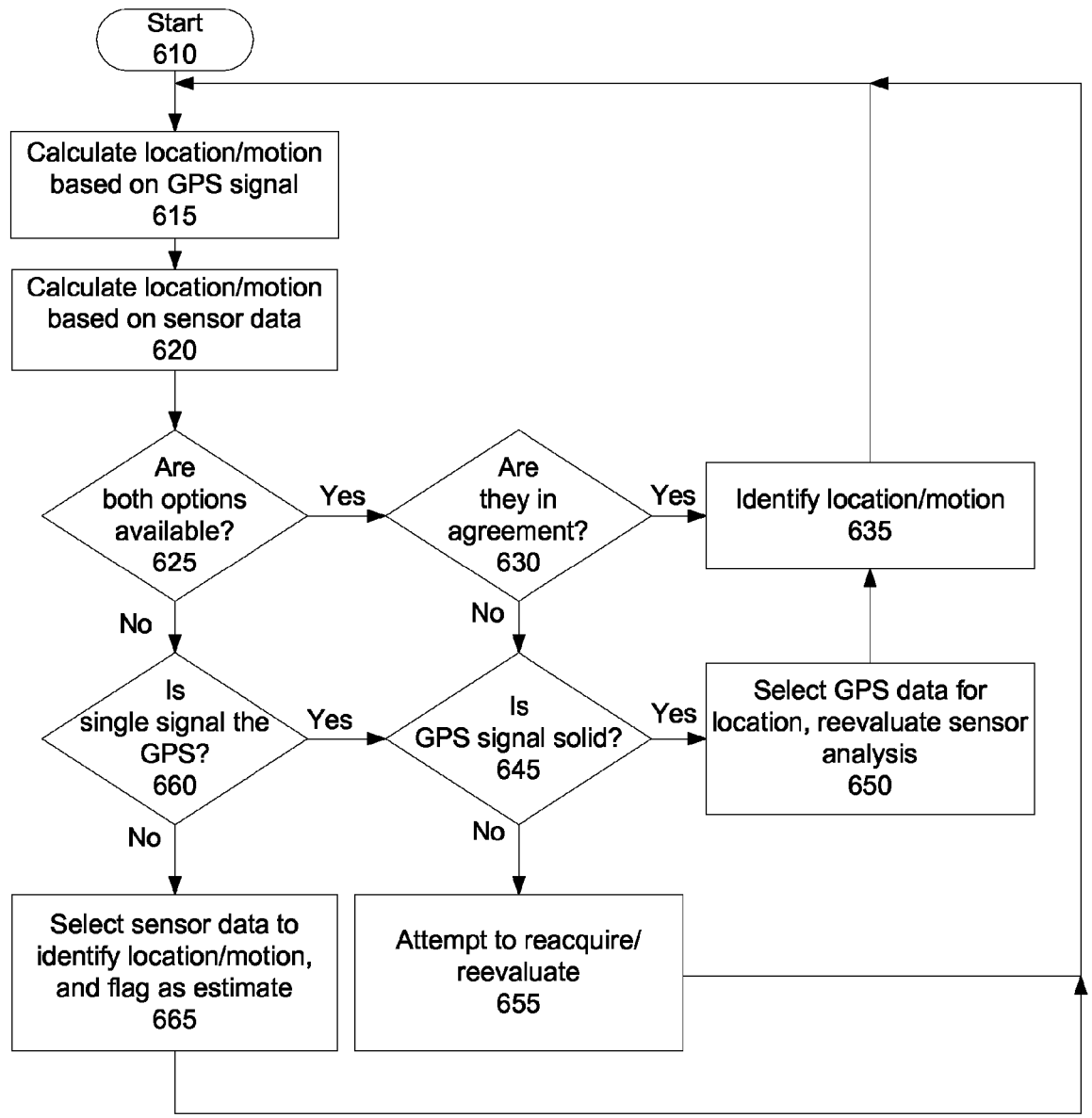
FIG. 6 is a flowchart of one embodiment of utilizing a combined source based system.

FIG. 6 is a flowchart of one embodiment of utilizing a combined A-GPS-based and accelerometer based processes. Although the process is described as being based on A-GPS, alternative methods of providing location, heading, and similar data may be utilized. The process enables the system to work even if the A-GPS signal temporarily becomes unavailable, as it does inside buildings, in urban canyons, etc. The process starts at block 610. In one embodiment, this process is continuously available when the personal navigation system is on.

At block 615, the A-GPS data is used to calculate location, motion, elevation, and other aspects which are relevant to the current activity. In one embodiment, the possible range of things which may be calculated based on a A-GPS signal includes: location (including latitude, longitude, and elevation), speed, heading. In one embodiment, a subset of these calculable values are calculated.

At block 620, the location/motion is calculated based on sensor data. In one embodiment, the sensor comprises at least one accelerometer. Other inertial sensors may be used, in one embodiment. In one embodiment, magnetometer (heading), pressure sensor (elevation detection) may also be part of the sensors. Other sensors may also be used. In one embodiment, the sensor and A-GPS-based calculations are continuously performed in parallel, when data is available. In one embodiment, separate processors, or subsystems are used to make these calculations.

At block 625, the process determines whether both options are available. If so, the process at block 630 determines whether they are in agreement. If so, the location, speed, heading, and other relevant data are identified, at block 635. The process then returns to block 610 to continue calculating based on A-GPS and sensor signals.

If at block 630 it was found that the two values (location/motion calculated by A-GPS and sensor) are not agreement, the process continues to block 645. At block 645, the process evaluates whether the A-GPS signal is solid. In one embodiment, this means that the A-GPS signal is not changing excessively, that a minimum number of GPS satellites' data is being received. In one embodiment, a "reality check" is done on the A-GPS signal. The reality check compares the last known location and heading, and determines whether based on a mode of travel identified the current location and heading is feasible. For example, a user travelling in a car could not move 100 miles in two readings a mere 10 minutes apart. If the A-GPS signal is found to be solid, at block 645, the process continues to block 650.

At block 650, the A-GPS data is selected for calculating the location. In one embodiment the sensor's reckoning algorithm is also evaluated in light of the updated location. In one embodiment, dead reckoning using a sensor may be inaccurate when the changes in acceleration are slow, or when the sensor needs to be calibrated, or for other reasons. In one embodiment, by using the feedback of the "actual location" based on the A-GPS signal, the sensor dead reckoning system can be adjusted to increase accuracy. The process also continues to block 635 to identify the location/motion. The process then returns to block 610 to continue calculations.

If at block 630 the two signals were found not to be in agreement, and the A-GPS signal was not found to be sound at block 645, the system attempts to reacquire signal, and reevaluate location. In one embodiment, the system updates the display and continues providing directions. In another embodiment, the system displays the "lost signal" indicator. In another embodiment, the system updates but flags the update as "estimate" indicating that the GPS signal is not solid. The process then returns to block 610 to continue calculations.

If, at block 625 both options were not found to be available, the process continues to block 660. At block 660, the process determines whether the single signal is the A-GPS signal. If so, the process continues to block 645, to determine whether the A-GPS signal is solid, as described above.

If the single signal is not the A-GPS signal, as evaluated at block 660, the process continues to block 665. At block 665, the sensor data is used to identify location and motion. In one embodiment, this result is flagged as an estimate. In one embodiment, the system further indicates that the A-GPS signal was not available. The process then returns to block 610, to continue acquiring signals and evaluate them.

In another embodiment, whenever the A-GPS signal is available, it is used. Only when the A-GPS signal is not available is the sensor data evaluated to determine whether it can be used as a "backup" to the A-GPS signal.

Figure 7A:
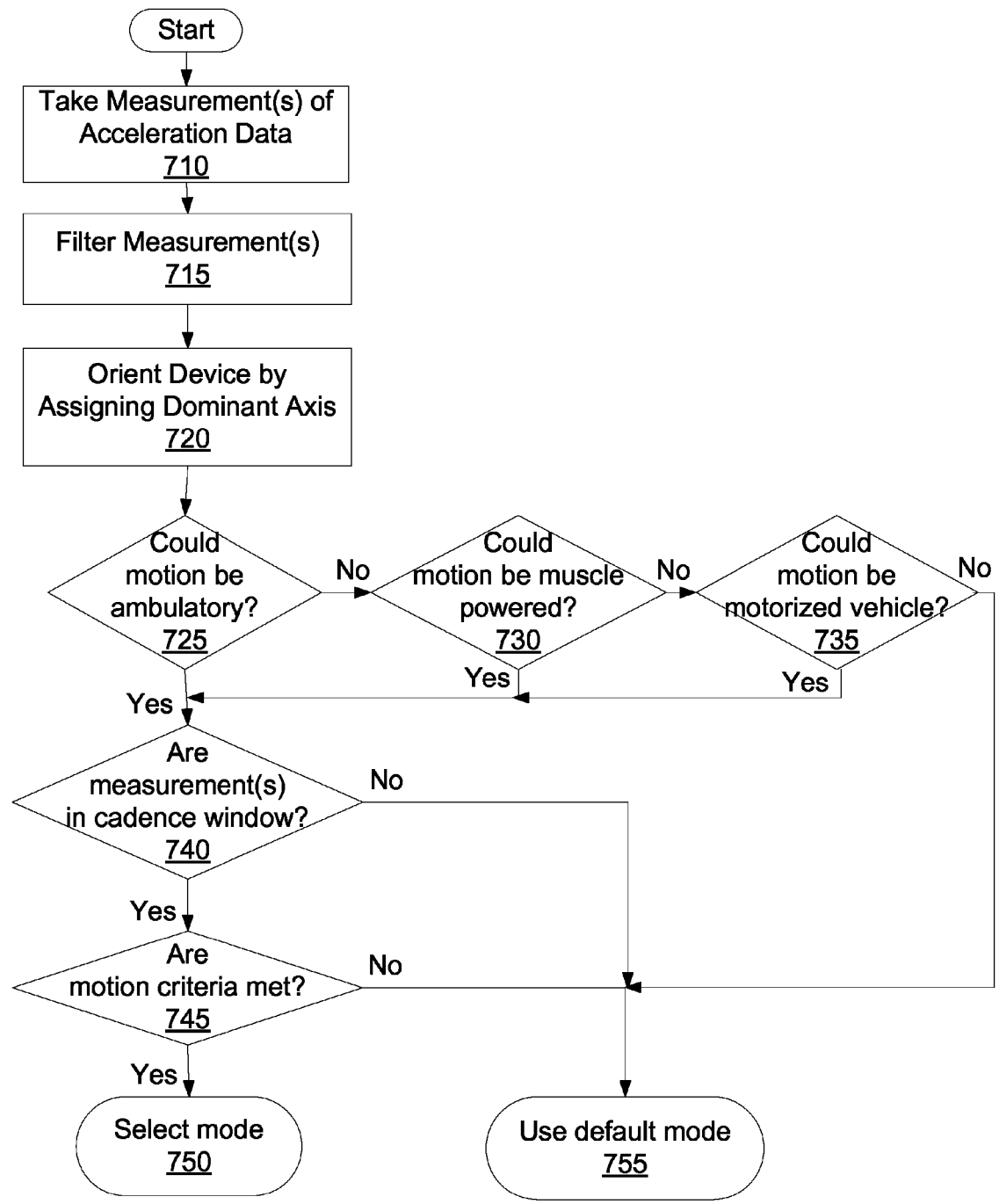
FIG. 7A is a flowchart of one embodiment of classifying sensor data to determine motion type, for assigning mode.

FIG. 7A is a flowchart of one embodiment of classifying sensor data to determine motion type, for assigning mode. The process starts at block 710. At block 710, the acceleration data is obtained. In one embodiment, acceleration data is obtained from a three-dimensional accelerometer embedded in the mobile personal navigation system. In on embodiment, the mobile personal navigation system may be part of a mobile phone, a watch, a headset, or another device which is designed to be carried/worn by a user. Measurements are taken according to a sampling rate, which may vary. In one embodiment, the sampling rate may range from one measurement per second to many measurements a second, depending on the operating mode being used.

At block 715, the measurements are filtered, in one embodiment. Measurements can be filtered to remove high frequency data and/or low frequency data. In one embodiment, what data to filter depends on the type of user activity being detected. For example, a low pass filter may be used to remove high frequency noise that would interfere with step counting when a user is walking. In contrast, a high pass filter may be used when quick motions are to be monitored.

At block 720, the sensor is oriented by assigning a dominant axis. Assigning a dominant axis may include calculating rolling averages of acceleration and assigning the dominant axis based on the rolling averages of acceleration. Assigning the dominant axis may also include determining which axis has the largest peak to peak difference. The dominant axis, in one embodiment, corresponds to the axis which is aligned with gravity, e.g. oriented along the Y-axis.

At block 725, the process determines whether the motion could be ambulatory. Ambulatory motion includes walking, running and other motions. If so, the process continues to block 740. If the motion could be muscle powered, as determined at block 725, the process continues to block 740 as well. If it is neither ambulatory nor muscle powered, the process determines whether it could be the motion of a motorized vehicle, at block 735. If so, the process continues to block 770 as well. If the motion cannot be identified, the process continues to block 755, and the default mode is selected. The default mode, in one embodiment, is driving mode.

At block 740, the process determines if the measurements are within the cadence window for the selected motion type. The cadence window defines a window of motion during which time another periodic motion is expected, in order to properly classify the movement. For example, for walking the cadence window may range from one step-type motion every third of a second to about every second and a half. Similarly, for bicycling there is a cadence window during which a pedal motion is expected. For a vehicle, in one embodiment, it is a determination that a certain level of horizontal acceleration was experienced during a particular window (e.g. indicating the user is driving in a vehicle). If the measurements are not within the cadence window, the process continues to block 755, and the default mode is selected. If the measurements are within the cadence window, the process continues to block 745.

At block 745, the process determines whether other motion criteria are met. Motion criteria may include speed of motion, angles and degrees of motion, etc. For example, in one embodiment the motion criteria may include whether acceleration along the dominant axis is greater than a lower threshold. In one embodiment, the process may determine whether the measurement exceeds the rolling average by a set margin. In one embodiment, the motion criteria may include whether acceleration along the dominant axis is greater than previous measurements. Other criteria than those mentioned may also be used. In one embodiment, any aspect of the accelerometer data may be evaluated. If the motion criteria for a particular mode are met, that mode is selected, at block 750. Otherwise, the default mode is selected at block 755.

In one embodiment, this evaluation is performed whenever a change in the mode is detected. In another embodiment, this evaluation is performed continuously, as the system receives accelerometer data. In another embodiment, this evaluation is performed whenever the motion pattern changes, e.g. the cadence of motion is altered. Other criteria for evaluating mode may be used.

Figure 7B:
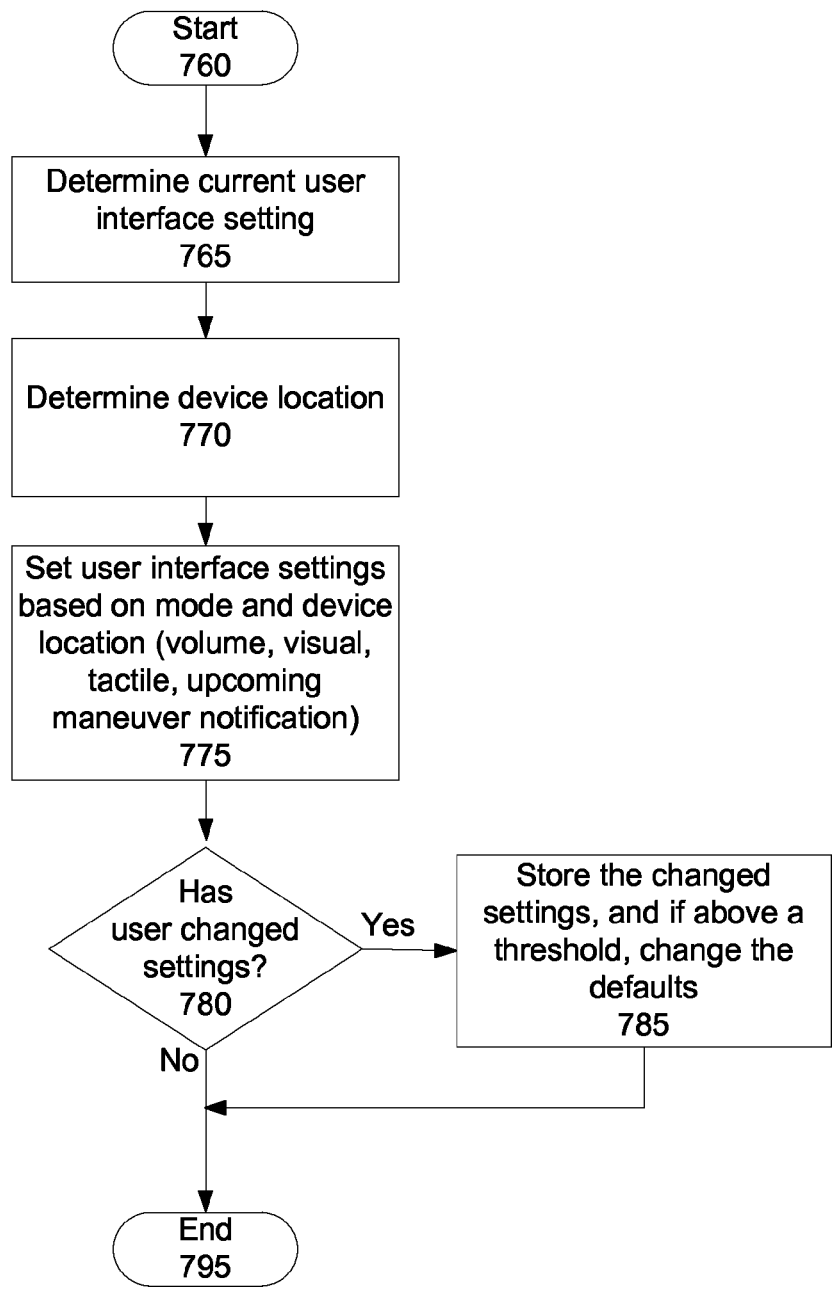
FIG. 7B is a diagram of one embodiment of using the motion type to set a communication mode.

FIG. 7B is a flowchart of one embodiment of using the selected mode to adjust the settings of the personal navigation device to optimize user experience. The process starts at block 760. In one embodiment, this process utilizes the mode selection, as described with respect to FIG. 7A.

At block 765, the process determines the current user interface settings. In one embodiment, the user interface setting form a prior session. In another embodiment, the system initializes with default settings.

At block 770, the process determines the device location. The device location is determined, in one embodiment, based on sensor data. For example, accelerometer data, proximity sensors, and other sensors enable the device to determine whether it's flat on a surface such as a car seat, in a mount in a car, in a user's pocket, in a purse, etc.

At block 775, the user interface settings are set based on the mode and the device location. In one embodiment, if the mode is undetermined and the device location is undetermined a default setting is applied. In one embodiment, if the system automatically starts-up with default settings, the process may directly end from block 770.

In one embodiment, the user interface settings may include volume settings, visual settings, tactile settings, and upcoming maneuver notification settings. Volume setting determines how loud announcements are made. Visual settings determine whether the display is turned on. In one embodiment, visual settings may further be adjusted based on whether it's light or dark outside. In one embodiment, this is determined based on an ambient light level, as determined by sensors. In another embodiment, this may be determined by the time of day, as provided by the clock. Thus, the visual display may be automatically backlit when it's needed. Tactile settings control the vibration of the device. The vibration may be useful to indicate upcoming turns, or changes in directions, etc. Upcoming maneuver notification preferences determine the first indication of a navigation instruction, prior to the instruction. For example, the system may say "turn right in ½ mile" or the like. This "½ mile" is the length of notice. For walking, a half mile notice is excessive, while for driving at freeway speeds, a one block notice is insufficient. Therefore, mode-based adjustment is useful. In one embodiment, the user may adjust the default settings. In one embodiment, the user may adjust settings, after the user interface is set by the system.

At block 780, the process determines whether the user changed the settings. In one embodiment, the user may adjust settings, after the user interface is set by the system. If the user has changed the settings, at block 785 the changes are stored. In one embodiment, if the user consistently changes the settings in the same way, the defaults are automatically adjusted, at block 785. This enables the user to indirectly change the defaults without actually accessing the settings of the device. The process then ends at block 795.

In one embodiment, the system utilizes a hybrid model for making map data and point of interest data available to the user. A hybrid solution is a combination of server based solutions and on-board solutions. In server based solutions the device sends start and end points to a server, and the server returns to device list of maneuvers, a list of geographic coordinates that's used to actually plot the route, and map tile images to show this plotted route line on an actual map. In on-board solutions the actual vector map data is pre-loaded onto the device. Thus, in an on-board solution the navigation engine 'knows' much more about the world than in a server solution where most of the smarts are on the server.

Figure 8A:
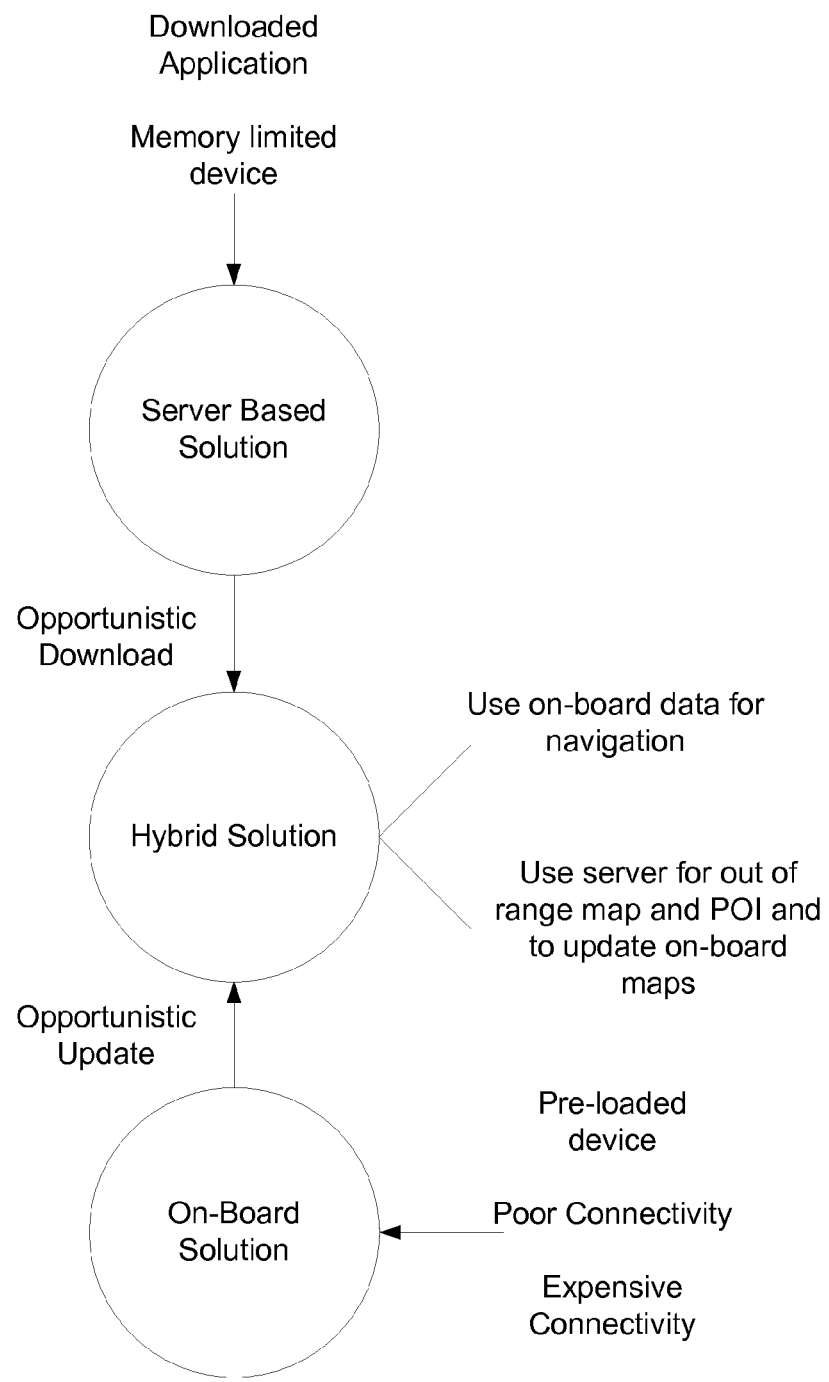
FIGS. 8A-C illustrate one embodiment of hybrid mapping.

The present system, in one embodiment, utilizes a hybrid approach. In one embodiment, the specific aspect of the hybrid approach selected depends on the device being used, the configuration of the application, the current connectivity, and expected future connectivity. FIG. 8A illustrates one embodiment of determining which of the hybrid options should be chosen for various circumstances.

In one embodiment, for pre-loaded applications—e.g. when the personal navigation device is sold on a hardware device—in one embodiment a primarily on-board solution is used, which uses the server connection to update map data and POI (points of interest) data. In one embodiment, the updating is done opportunistically when a low-cost high bandwidth connection is available. In one embodiment, the connection is a wireless connection or a connection to a computer which has a network connection.

In one embodiment, for downloaded applications, a primarily server-based solution is downloaded. In one embodiment, this applies when an application is downloaded over a slower connection, e.g. cellular network or low bandwidth wireless network, a connection that charges for bandwidth, or in a time limited situation. This minimizes the download time and cost, and places the application on the device quickly. The map data and POI data, in one embodiment, can then opportunistically be downloaded when the device is connected to a higher bandwidth connection.

In one embodiment, for a system having occasional connectivity only, for example a device that only had a wireless network connection, a mostly on-board solution may be used. In contrast, for a device which had high bandwidth network access, a mostly server-based solution may be used.

In one embodiment, depending on the connection capabilities of the device, the division between on-board and server capabilities may be split in different ways. In one embodiment, the hybrid solution includes both a full on-board and full server capabilities. The two complete systems can do the same thing, e.g. provide location, navigation, and search to the user, but have different strengths. The system can determine which solution to use, based on the situation.

Figure 8B:
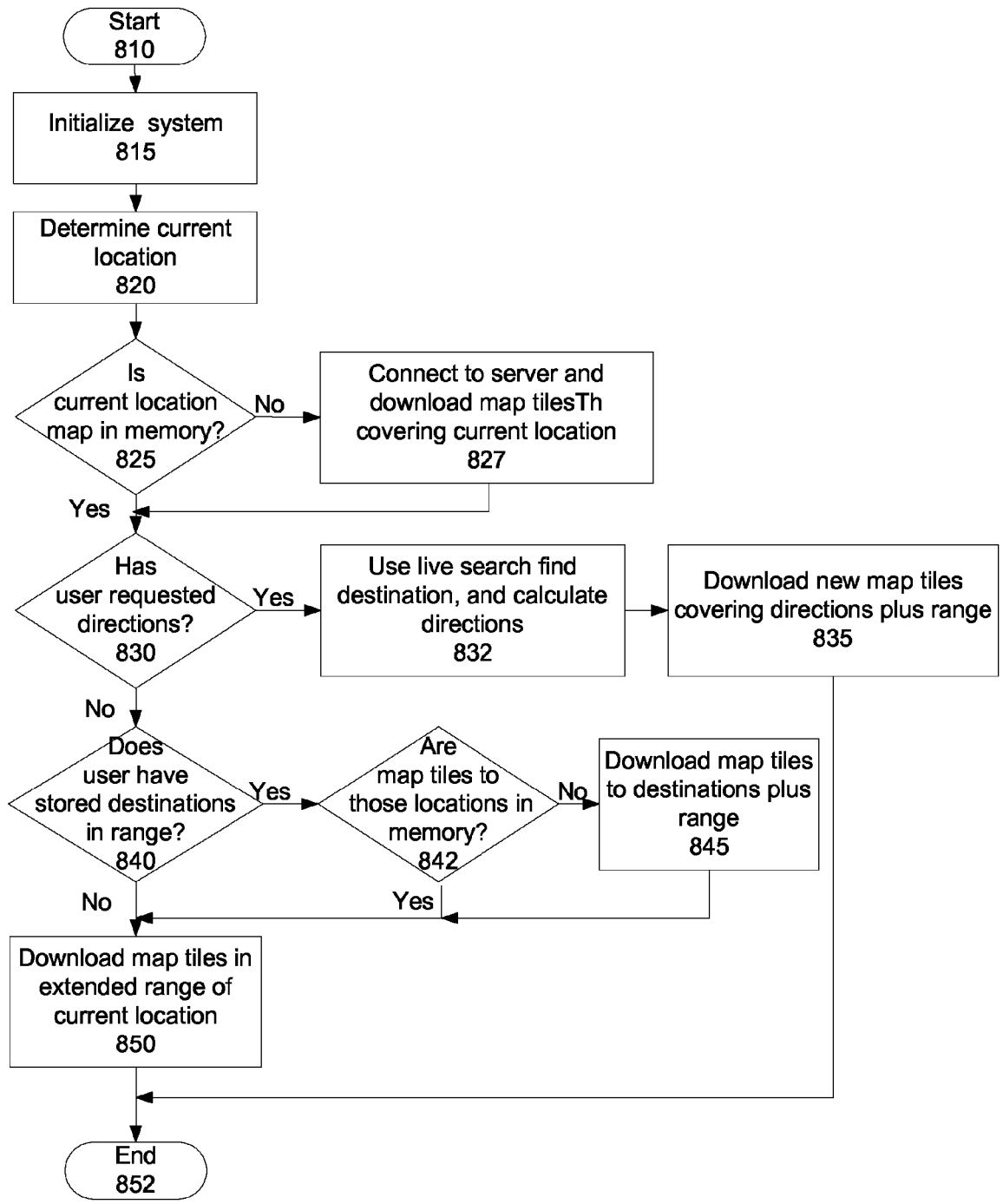

FIG. 8B is a flowchart of one embodiment of using a hybrid mapping GPS system operating in a primarily server-based mode. The process starts at block 815. At block 815 the GPS system is initialized. At block 820, the current location is determined. This is done using known GPS techniques.

At block 825, the process determines whether the map tiles for the current location are in memory. In a primarily server based mode, only local maps or previously used maps are stored locally. As noted above, this may be useful in situations where bandwidth is expensive, or memory is limited. In one embodiment, maps shown to the user on a personal navigation system are addressed as map tiles. These map tiles may include street maps, photo-based maps, indicators of points of interest, underlying data which indicates travel-relevant information (e.g. speed limits, lights, one-way streets, etc.) A map tile may be a sub-screen sized tile, or full screens, or other units which define a map view, or portion of a map view. For simplicity, these map units will be referred to as map tiles herein. However, one of skill in the art understands that this refers to any unit of map image and description data which may be used on the personal navigation system.

If the map tiles for the current location are not in memory, the process at block 827 connects to the server to download the map tiles associated with the current location. In one embodiment, these map tiles may comprise multiple images each corresponding to a different zoom level. In one embodiment, map tiles "covering" the current location includes a current location and a predetermined range around the current location. For example, in one embodiment, the range includes map tiles for the entire city. The process then continues to block 830. If the current location was in memory, the process continues directly to block 830.

At block 830, the process determines whether the user has requested directions. In general, when users turn on the personal navigation system, they often are in the process of requesting directions. If a request for directions has been received, the process continues to block 832. At block 832, in one embodiment the system uses live search to find the destination and calculate directions. Live search refers to using search on the server. At block 835, the system downloads any new map tiles associated with the directions and a range around the directions. The system assumes that the user may not follow directions perfectly. For example, the user may accidentally take a left instead of a right. By downloading a range, in addition to the map tiles associated with the directions, the system is likely to be able to provide mapping even if the server is not available during the drive. The process then ends at block 852.

In one embodiment, if the server is not available, when a request for directions is received, the process determines whether the directions have been cached from a previous request. If so, the system provides those directions. Otherwise, in one embodiment, the user is requested to wait. In another embodiment, if the appropriate map tiles/map data is available on the Personal navigation system, the Personal navigation system can locally calculate directions.

If, at block 830, the system determined that the user has not requested directions, the process continues to block 840. At block 840, the process determines whether the user has any stored destinations in range. In one embodiment, the "range" may be set by the user. In one embodiment, the range may be set automatically based on an average travel by this user. In one embodiment, the range may be set automatically based on the average travel by all users. Alternative methods of defining the range may be used.

If the user has stored destinations in range, the process determines at block 842 whether map tiles to these locations are in memory. If not, at block 845 the relevant map tiles are downloaded. As noted above, in one embodiment the "map tile" as used herein may include the visual map image, the underlying travel-relevant data, and points of interest within the area defined by the map. The process then continues to block 850. At block 850, the map tiles in extended range of the current location are downloaded. The process then ends at block 852.

The present hybrid system presents the advantages of a server-based system and the advantages of a pre-stored mapping system. The advantages of the server based system include updated data (many download based systems update their mapping data only once a month or less frequently), small initial download (download based systems include all maps of the entire area (e.g. all of the United States, or Europe, or relevant zone) in the initial download. The advantages of a download based system are that the mapping data is available continuously, even if the server is temporarily unavailable. By providing pre-downloading of map tiles, and predictive caching, the system provides continuous mapping data, even if the server is temporarily available. From the perspective of the user, the server connection is only needed for live search. This is a significant advantage, especially when travelling in areas where where network connectivity may be interfered with, or unavailable.

Figure 8C:
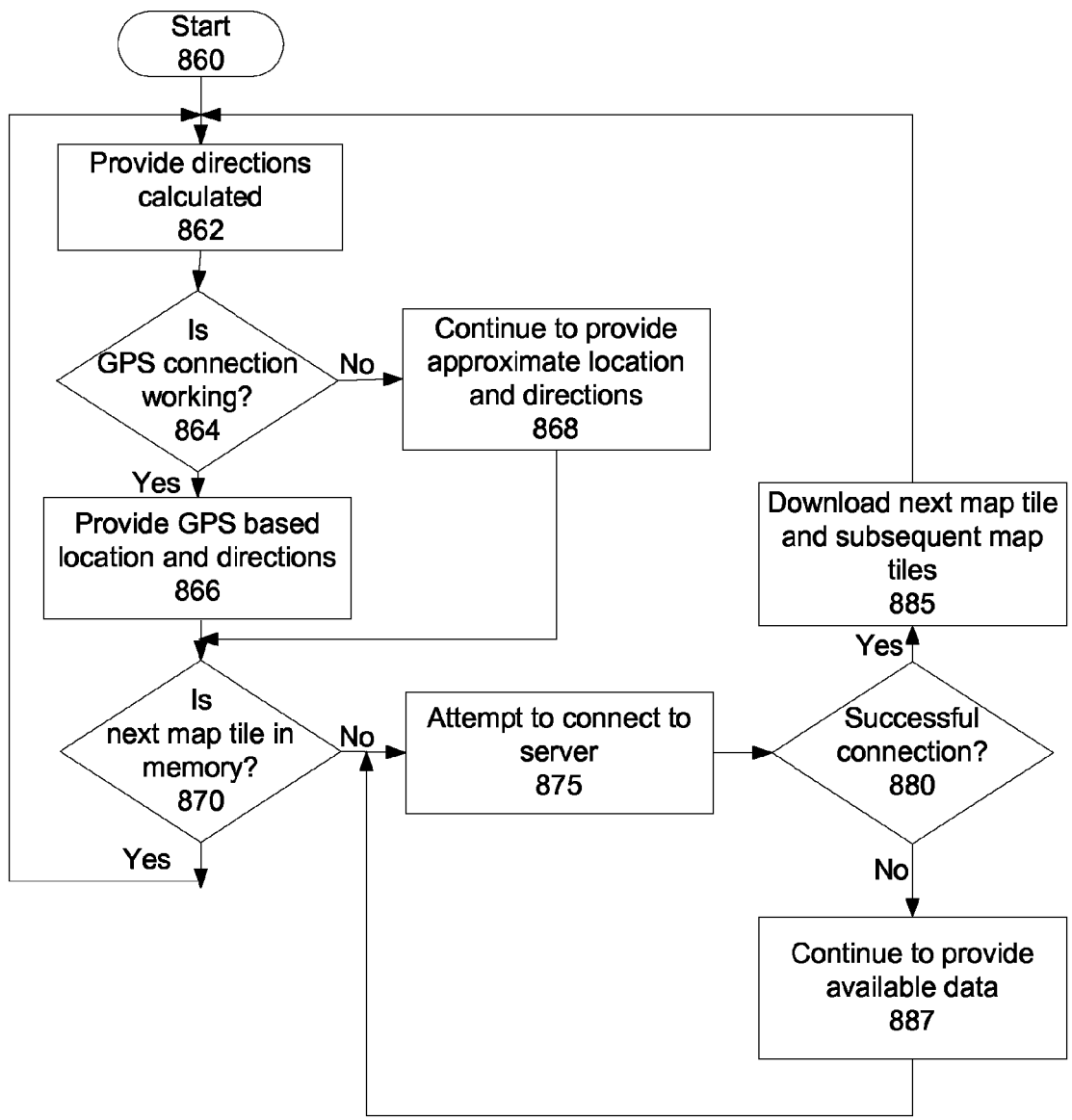

FIG. 8C is a flowchart of one embodiment of using a hybrid mapping GPS system which is primarily server based. The process starts at block 860, when the system has directions from point A to point B. At block 862, the system provides the calculated directions. In general, these directions are provided verbally or visually to the user. Verbal directions may include "turn right at the next intersection," "tend right," etc. Visual directions may include an arrow on a map. In one embodiment, the map may be shown from above at an angle, as if the user were travelling over the map, with the map oriented to the user's own current direction (e.g. when the user is driving west, the top of the map is West, rather than North.)

At block 864, the process determines whether the GPS connection is working. If so, the GPS based location and directions are provided, at block 866. Otherwise, approximate location and direction data is provided based on sensor data, at block 868.

At block 870, the process determines whether the next map tile is in memory. In one embodiment, the "next map tile" is a map tile adjacent in any direction to the currently shown map tile. In another embodiment, the "next map tile" is extended to multiple map tiles adjacent to a current map tile in every direction. In another embodiment the "next map tile" may be extended to different distances based on direction of travel, e.g. extended further forward than sideways when the user is driving on the freeway.

If the next map tile is in memory, the process returns to block 862 to continue providing directions. If the next map tile is not in memory, the process continues to block 875. At block 875, the process attempts to connect to the server.

If the connection is successful, as determined at block 880, the next map tiles are downloaded at block 885. In one embodiment, the next map tiles may extend further than the "next map tile" which was tested. In one embodiment, the distance may be increased if prior attempts to connect to the network failed. The process then returns to block 862 to continue providing directions.

If the attempt to connect to the network was not successful, the process continues to block 887 to continue providing available data while returning to block 875 to attempt connecting to the server again. In one embodiment, available data may include the map tiles that are downloaded. However, once the system runs out of map tiles, the approximate location can still be provided. In one embodiment, sensor data may be used to supplement the GPS data.

In this way, the hybrid system can provide more data than a traditional server-based system. The addition of the sensor for location further provides features that improve the user's GPS experience.

Figure 9:
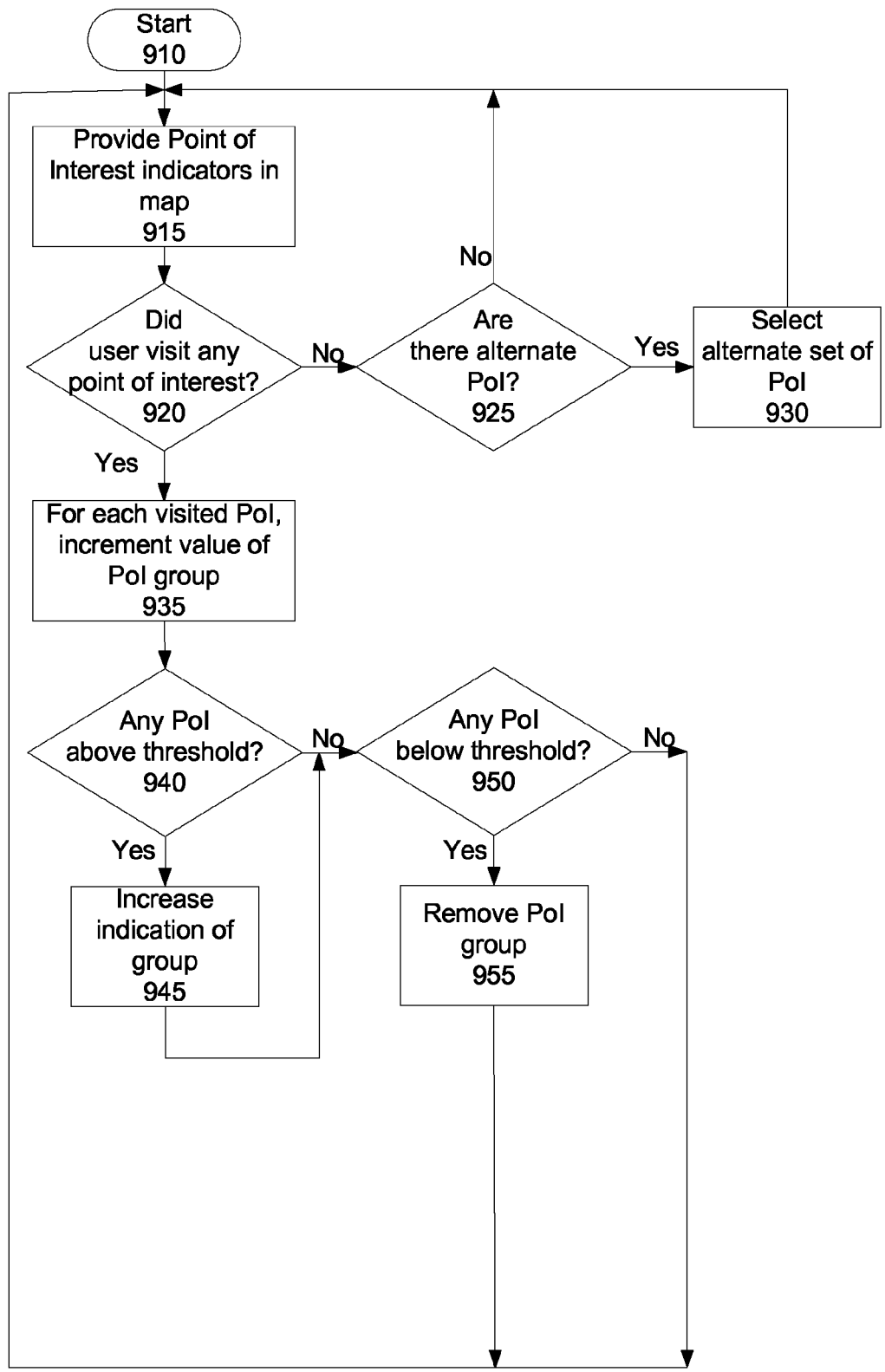
FIG. 9 is a flowchart of one embodiment of a learning system.

FIG. 9 is a flowchart of one embodiment of a learning system. The process starts at block 910. In one embodiment, this process is continuous. In another embodiment, this evaluation is made periodically. In one embodiment, this evaluation is made prior to downloading additional data, such as additional maps, points of interest, or other data.

At block 915, the points of interest are provided within the map. In one embodiment, this is automatically downloaded when a map tile is downloaded. In another embodiment, points of interest are separately provided. In another embodiment, the user may set preferences, as to the provision of points of interest.

At block 920, the process determines whether the user visited any points of interest. In one embodiment, as noted above, this evaluation takes place prior to downloading further points of interest data. In one embodiment, this evaluation occurs periodically, where the period is longer than a day. In one embodiment, this includes any points of interest visited when the personal navigation device is active, whether or not directions were provided to the point of interest. For example, the user may be walking around, and choose to visit a restaurant, or book store, or other point of interest. If no points of interest were visited, the process continues to block 925.

At block 925, the process determines whether alternate points of interest sets are available. In one embodiment, points of interests may be grouped together in sets. For example, the set may be burger places, or chain coffee houses. If the user has not visited any points of interest, it is a strong indication that the points of interest are not relevant to the user. In which case, in one embodiment, the process attempts to acquire an alternate points of interest set. For example, if a user has not visited any points of interest that correspond correspond to the fast food restaurants set, the system may attempt to obtain a "non-chain restaurants" set, if such a set is available. If there is another point of interest set, at block 930, that point of interest set is selected. Then, the process returns to block 915, to provide points of interest indicators. If there are no alternate sets, the process returns to block 915, to continue providing the points of interest.

If the user has visited points of interest, the process continues to block 935. At block 935, for each visited point of interest, the value of the point of interest grouping is incremented. The point of interest grouping, in one embodiment, is all locations of the same point of interest. For example, if the user visited a Barnes and Noble® bookstore, in one embodiment all bookstores, or all B&N bookstores' value may be incremented.

At block 940, the process determines whether any point of interest is above a threshold. In one embodiment, a threshold may be an overall value, or a time-based value. For example, in one embodiment, if a user has visited a particular burger chain at least five times, it is considered above the threshold. In another embodiment, if a user has visited a particular coffee shop at least twice in a week, it is considered above a threshold. If the point of interest is determined to be above the threshold, the indication associated with that point of interest group is increased. The process then continues to block 950.

At block 950, the process determines whether any point of interest is below a threshold. In one embodiment, a point of interest is below a threshold if it has not been visited in a particular period, or has been never visited. If the point of interest is below the threshold, the point of interest group is removed, at block 955. The process then returns to block 915.

In one embodiment, the learning may also include learning about user preferences regarding notification timing. For example, in one embodiment, when the user is taking a long trip, the system evaluates the length of the trip (based on the requested directions), and emphasizes points of interest based on a likelihood that the user will stop. For example, if the user is taking a four hour drive, it is unlikely that he or she will stop at any point of interest in the first thirty minutes. If the user has travelled far, in one embodiment, the relevant points of interest are added to the map. The points of interest may be indicated as icons, logos, text, verbal announcements, etc. In one embodiment, the user may set his or her preferences at to the length of trip before such announcements are made, and the format of the announcement. In one embodiment, the system may adjust these settings based on user actions. For example, if the user doesn't stop until at least half-way through the trip, based on past observed behavior, the system may adjust notifications to be emphasized at that point. Other aspects of settings and notification may also be adjusted based on detected user behavior.

Figure 10:
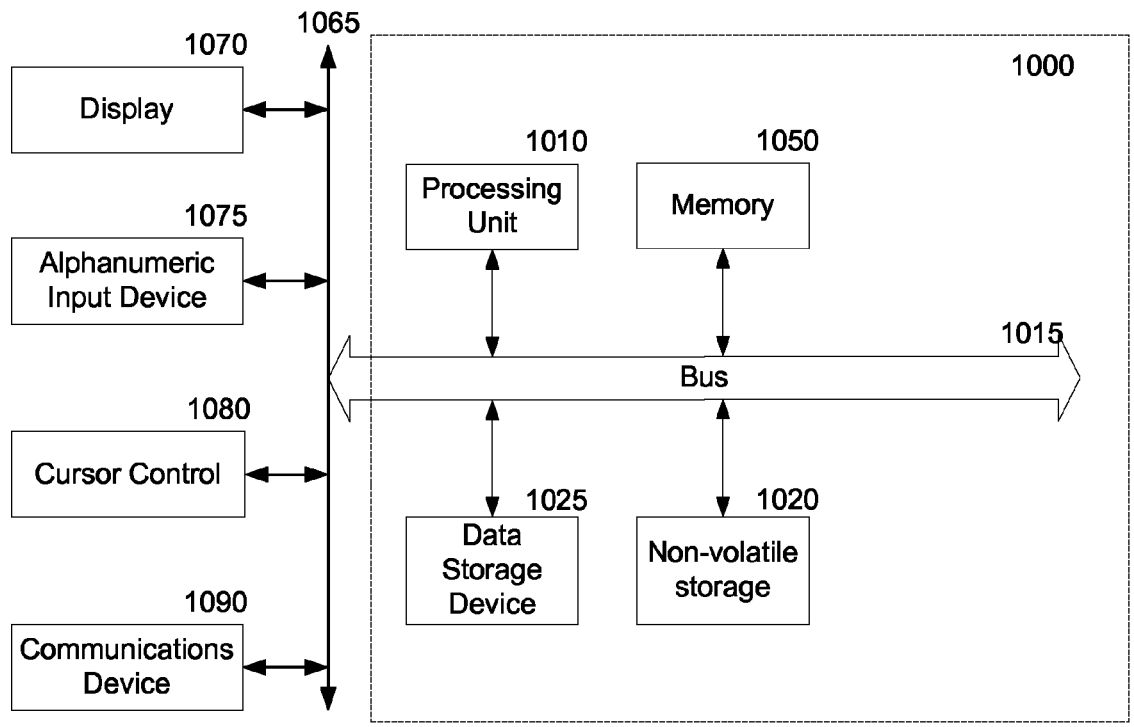
FIG. 10 is a block diagram of one embodiment of a computer system which may be used with the present invention.

FIG. 10 is a block diagram of one embodiment of a computer system which may be used with the present invention. FIG. 10 is a block diagram of a particular machine which may be used with the present invention. It will be apparent to those of ordinary skill in the art, however that other alternative systems of various system architectures may also be used.

The data processing system illustrated in FIG. 10 includes a bus or other internal communication means 1015 for communicating information, and a processor 1010 coupled to the bus 1015 for processing information. The system further comprises a random access memory (RAM) or other volatile storage device 1050 (referred to as memory), coupled to bus 1015 for storing information and instructions to be executed by processor 1010. Main memory 1050 also may be used for storing temporary variables or other intermediate information during execution of instructions by processor 1010. The system also comprises in one embodiment a read only memory (ROM) and/or static storage device 1020 coupled to bus 1015 for storing static information and instructions for processor 1010, and a data storage device 1025 such as a magnetic disk or optical disk and its corresponding disk drive, or Flash memory or other storage which is capable of storing data when no power is supplied to the system. Data storage device 1025 in one embodiment is coupled to bus 1015 for storing information and instructions.

The system may further be coupled to a display device 1070, such as a cathode ray tube (CRT) or a liquid crystal display (LCD) coupled to bus 1015 through bus 1065 for displaying information to a computer user. An alphanumeric input device 1075, such as a keyboard including alphanumeric and other keys, may also be coupled to bus 1015 through bus 1065 for enabling a user to communicate information and command selections to processor 1010. An additional user input device may further be included. One such user input device is cursor control device 1080, such as a mouse, a trackball, stylus, or cursor direction keys may be coupled to bus 1015 through bus 1065 for communicating direction information and command selections to processor 1010, and for controlling cursor movement on display device 1070.

Another device, which may optionally be coupled to computer system 1000, is a communication device 1090 for accessing other nodes of a distributed system via a network. The communication device 1090 may include any of a number of commercially available networking peripheral devices such as those used for coupling to an Ethernet, token ring, Internet, or wide area network, personal area network, wireless network or other method of accessing other devices. The communication device 1090 may further be a null-modem connection, or any other mechanism that provides connectivity between the computer system 1000 and the outside world. Note that any or all of the components of this system illustrated in FIG. 10 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 1050, mass storage device 1025, or other storage medium locally or remotely accessible to processor 1010.

It will be apparent to those of ordinary skill in the art that the system, method, and process described herein can be implemented as software stored in main memory 1050 or read only memory 1020 and executed by processor 1010. This control logic or software may also be resident on an article of manufacture comprising a computer readable medium having computer readable program code embodied therein and being readable by the mass storage device 1025 and for causing the processor 1010 to operate in accordance with the methods and teachings herein.

The present invention may also be embodied in a handheld or portable device containing a subset of the computer hardware components described above. For example, the handheld device may be configured to contain only the bus 1015, the processor 1010, and memory 1050 and/or 1025. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1010, a data storage device 1025, a bus 1015, and memory 1050, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of utilizing a personal navigation system comprising:
    providing navigation to a user, the navigation specifying directions from a first location to a second location;
    automatically determining a mode of travel of the user, the automatically determined mode of travel selected from among: a motorized vehicle, a muscle-powered vehicle, and ambulatory motion; and
    calculating the directions based on the mode of travel, the mode of travel defining a set of constraints for the navigation, such that a route selection is altered based on the mode of travel, wherein the set of constraints includes one or more of traffic level, one way streets, walking paths, presence of sidewalks, presence of bicycle paths, and change in elevation.

2. The method of claim 1, further comprising:
    automatically detecting a change in the mode of travel of the user; and
    recalculating the directions based on the change.

3. The method of claim 1, wherein determining the mode of travel comprises:
    utilizing a sensor to determine a type of movement executed by the user carrying the device; and
    classifying the type of movement to identify the mode of travel.

4. The method of claim 3, wherein utilizing the sensor to determine the type of movement comprises:
    identifying a cadence window for a movement;
    determining if a motion signature associated with the movement matches the identified cadence window; and
    classifying the movement.

5. The method of claim 1, further comprising:
    determining a location, speed, and bearing of the device based on a global positioning system (GPS) signal; and
    utilizing the GPS signal to calculate the navigation.

6. The method of claim 5, further comprising:
    determining an estimated location, speed, and bearing of the device based on motion sensor data; and
    utilizing the motion sensor data with the navigation.

7. The method of claim 6, further comprising:
    when the GPS signal is not available, utilizing the motion sensor data to continue providing navigation.

8. The method of claim 6, further comprising:
    evaluating an accuracy of the motion sensor data for the user's location, speed, and bearing based on the received GPS data.

9. The method of claim 1, further comprising:
    initially providing navigation via a first route for travel via a motorized vehicle;
    detecting a change of the mode based on identifying user motions corresponding to a user exiting the motorized vehicle; and
    providing a navigation via a second route, for travel via ambulatory motion, the second route based on constraints associated with ambulatory motion.

10. A personal navigation system including modes, comprising:
    a mode selector to automatically determine a mode of travel of the user, the mode of travel selected from among: a motorized vehicle, a muscle-powered vehicle, and ambulatory motion; and
    a direction calculator to provide navigation based on the mode of travel, the direction calculator receiving input from a mode logic, to route based on constraints associated with the determined mode of travel of the user, wherein the set of constraints includes one or more of traffic level, one way streets, walking paths, presence of sidewalks, presence of bicycle paths, and change in elevation.

11. The system of claim 10, wherein the mode of travel comprises one of: motorized vehicle, muscle-powered vehicle, and ambulatory motion.

12. The system of claim 10, further comprising:
the mode selector further to detect a change in the mode of travel of the user; and
the direction calculator further to recalculate the navigation based on the change.

13. The system of claim 10, wherein determining the mode of travel comprises the mode selector receiving sensor data and utilizing the sensor data to determine a type of movement executed by the user carrying the device, and classifying the type of movement to identify the mode of travel.

14. The system of claim 13, wherein utilizing the sensor data to determine the type of movement comprises identifying a cadence window for a movement, determining if a motion signature associated with the movement matches the identified cadence window, and if so, classifying the movement.

15. The system of claim 10, further comprising:
a GPS location logic to determine a location, speed, and bearing of the device based on a global positioning system (GPS) signal, the direction calculator using the GPS signal to calculate the navigation.

16. The system of claim 15, further comprising:
a sensor location logic to determine an estimated location, speed, and bearing of the device based on sensor data, the navigation module using the sensor data with the navigation.

17. The system of claim 16, further comprising:
the navigation module utilizing the sensor location logic determined data when the GPS signal is not available to continue providing navigation.

18. The system of claim 16, further comprising:
an evaluation logic to compare the GPS location data and the sensor location data, and adjust the calculations for the sensor location data when a systemic error is identified.

19. The system of claim 10, further comprising:
navigation module initially providing navigation for travel via a motorized vehicle;
the mode selector detecting a change of the mode when a user exits the motorized vehicle; and
the navigation module providing a navigation for travel via ambulatory motion, the direction calculator calculating an updated route, based on the constraints associated with ambulatory motion.

20. A personal navigation system comprising:
a mode selector to utilize sensor data to automatically determine a mode of travel of a user, the mode selected from among motorized vehicle, muscle-powered vehicle, and ambulatory motion;
a navigation module to calculate a navigational path for a user based on the mode of movement, the path meeting a plurality of constraints associated with the mode of movement, the constraints including one or more of: road data and traffic data.

21. The system of claim 20, further comprising:
the mode selector to determine a change in the mode of movement of the user; and
the navigation module receiving the change in the mode from the mode selector, and recalculating the navigational path based on the change in the mode of movement.

22. A personal navigation system comprising:
user context logic to determine a user's current context in using the personal navigation system, the context logic to identify a switch in context when detecting the user exiting a vehicle; and
navigation module to provide navigation based on the user's current context and location information, a route selected based on constraints associated with the user's current context, such constraints including one or more of: speed limits, directionality, traffic levels, bike lane availability, walking paths, vertical change, and public transportation options.

23. The personal navigation system of claim 22, further comprising:
a global positioning system calculator to determining a location, speed, and bearing of the device based on the global positioning system (GPS) signal;
a motion sensor to determine an estimated location, speed, and bearing of the device based on motion sensor data; and
a processor to evaluate an accuracy of the motion sensor data for the user's location, speed, and bearing based on the received GPS data.

24. The personal navigation system of claim 22, wherein the navigation module initially provides navigation via a first route for travel via a motorized vehicle; and
the user context logic to detect a change of the user context based on identifying user motions corresponding to a user exiting the motorized vehicle; and
the navigation module to provide a navigation via a second route, for travel via ambulatory motion, the second route based on constraints associated with ambulatory motion.

* * * * *